US00RE38286E

(19) United States
(12) Reissued Patent
Flowers

(10) Patent Number: US RE38,286 E
(45) Date of Reissued Patent: Oct. 28, 2003

(54) SURFACE POSITION LOCATION SYSTEM AND METHOD

(75) Inventor: Mark Flowers, Los Gatos, CA (US)

(73) Assignee: LeapFrog Enterprises, Inc., Emeryville, CA (US)

(21) Appl. No.: 09/796,685

(22) Filed: Feb. 28, 2001

Related U.S. Patent Documents

Reissue of:
(64) Patent No.: 5,877,458
Issued: Mar. 2, 1999
Appl. No.: 08/754,310
Filed: Nov. 21, 1996

(63) Continuation-in-part of application No. 08/601,719, filed on Feb. 15, 1996, now Pat. No. 5,686,705.

(51) Int. Cl.[7] ..... G08C 21/00; G09G 5/00

(52) U.S. Cl. ..... 178/18.01; 178/18.03; 178/19.01; 345/174

(58) Field of Search ..... 178/18.01, 18.02, 178/18.03, 18.05, 18.06, 18.07, 19.01, 19.02, 19.03; 345/173, 174, 179

(56) References Cited

U.S. PATENT DOCUMENTS

| | | | |
|---|---|---|---|
| 2,182,334 | A | 12/1939 | Crespo |
| 2,932,907 | A | 4/1960 | Stieber et al. |
| 3,292,489 | A | 12/1966 | Johnson et al. |

(List continued on next page.)

FOREIGN PATENT DOCUMENTS

| | | |
|---|---|---|
| EP | 539053 A1 | 4/1993 |
| JP | S57-038486 | 3/1982 |
| JP | S61-46516 | 3/1986 |
| JP | H5-137846 | 6/1993 |
| JP | H5-217688 | 8/1993 |

OTHER PUBLICATIONS

British Micro, "Operating Guide to Grafpad", 1982, 28 pp.

*Primary Examiner*—Vijay Shankar
(74) *Attorney, Agent, or Firm*—Townsend, Townsend & Crew LLP

(57) ABSTRACT

An electrographic sensor unit and method for determining the position of a user selected position thereon. The electrographic sensor unit includes a layer of a conductive material having an electrical resistivity and a surface, at least three spaced apart contact points electrically interconnected with a layer of conductive material, a processor connected to the spaced apart contacts and disposed to selectively apply a signal to each of the contact points, and a probe assembly, that includes either a stylus of a flexible conductive layer spaced apart from the layer, coupled to the processor with the stylus disposed to be positioned by a user in vicinity of a user selected position on the surface of the layer, or that position being selected with a user's finger on the flexible layer and to receive signals from the layer when the contact points have signals selectively applied thereto. The user selected position is determined by the processor from signals received from the stylus, or flexible layer, each in relation to a similar excitation of different pairs of the contact points under control of the processor. The conductive layer may be either two or three dimensional and may be a closed three dimensional shape. There may also be multiple layers with the processor being able to discern on which of those layers the user selected position is located. Further, provision is made to correct the calculated coordinates of the selected position for variations in contact resistance of each of the contact points individually. Additionally, a nonconductive skin having selected graphics printed thereon, such as a map, can be placed over the layer and the proces-sor further convert the calculated coordinates of the selected position to coordinates that relate to the graphical information printed in the skin, and even electro-nically (e.g., audio or visual) present information to the user relative to the graphical location selected as the selected position.

42 Claims, 13 Drawing Sheets

U.S. PATENT DOCUMENTS 3,304,612 A 2/1967 Proctor et al.
3,798,370 A 3/1974 Hurst ..... 178/18
3,911,215 A 10/1975 Hurst et al. ..... 178/18
3,921,165 A 11/1975 Dym
4,220,815 A 9/1980 Gibson et al. ..... 178/18
4,492,819 A 1/1985 Rodgers et al.
4,570,149 A 2/1986 Thornburg et al.
4,603,231 A 7/1986 Reiffel et al.
4,630,209 A 12/1986 Saito et al. ..... 364/444
4,650,926 A 3/1987 Nakamura et al.
4,686,332 A 8/1987 Greanias et al. ..... 178/19
4,706,090 A 11/1987 Hashiguchi et al. ..... 345/173
4,853,498 A 8/1989 Meadows et al. ..... 178/19
4,853,499 A 8/1989 Watson ..... 178/19
4,913,463 A 4/1990 Tlapek et al. ..... 281/49
4,922,061 A 5/1990 Meadows et al. ..... 178/18
5,007,085 A 4/1991 Greanias et al. ..... 178/18
5,030,117 A 7/1991 Delorme ..... 434/130
5,057,024 A 10/1991 Sprott et al. ..... 434/146
5,113,178 A 5/1992 Yasuda et al. ..... 345/173
5,117,071 A 5/1992 Greanias et al. ..... 178/19
5,149,919 A 9/1992 Greanias et al. ..... 178/18
5,157,384 A 10/1992 Greanias et al. ..... 345/179
5,220,136 A 6/1993 Kent ..... 178/18
5,417,575 A 5/1995 McTaggart ..... 434/317
5,438,168 A 8/1995 Wolfe et al.
5,485,176 A 1/1996 Ohara et al. ..... 345/173
5,575,659 A 11/1996 King et al. ..... 434/467
5,686,705 A 11/1997 Conroy et al. ..... 345/173
5,877,458 A 3/1999 Flowers ..... 178/18.01

SURFACE POSITION LOCATION SYSTEM AND METHOD

Matter enclosed in heavy brackets [ ] appears in the original patent but forms no part of this reissue specification; matter printed in italics indicates the additions made by reissue.

This application is a Continuation-In-Part application of an earlier filed co-pending patent application with the same title filed on Feb. 15, 1996, and given Ser. No. 08/601,719 which includes as an inventor the inventor of the present invention.

FIELD OF THE INVENTION

The present invention relates to a system and method for determining a location selected by a user on a surface and providing information to the user that has been determined to be relative to that location. In particular the present invention relates to position detection devices that are able to detect positions on a surface of two and three dimensional objects that have complex shapes. Additionally it relates to position detection devices in which the object may be turned, rotated or otherwise manipulated relative to the rest of the position detection system. Further, the present invention relates to provision of a ground point on the pointing device to ground the user to the system to minimize noise input to the system processor and potential error in position identification.

BACKGROUND OF THE INVENTION

A variety of technologies exist to determine the position of a stylus, or even a finger, placed on a surface. One technology is a grid of horizontal and vertical wires that are placed below the surface of a flat tablet or over the surface of a display device and emit position indicating signals which are detected by a stylus. Two devices using this type of technology are described in U.S. Pat. Nos. 5,149,919 and 4,686,332 to Greenias, et al. Applications using these devices are computer input drawing (or digitizing) tablets, and touch-screen display devices.

In another technology, surface acoustic waves are measured at the edges of a glass plate and are used to calculate the position on the plate that was selected by a finger or a stylus. Applications include high use touch screen kiosk displays where a conductive overlay technology would wear out.

Yet other technologies include the use of light pens as optical detectors. Additionally a frame around a flat display with an array of light emitters and detectors around the edge of the frame, may be used to detect when a finger or stylus is near the display surface. These technologies are limited to displays or flat surfaces.

Position detectors such as the devices disclosed in the Greanias patents, that use many conductors arranged in a grid, are not well suited to a complex shaped surface of either two or three dimensions. There are, at a minimum, difficulties in positioning and shaping the conductors to fit the contours of a complex shape.

Another similar device is a grid of horizontal and vertical wires placed over or beneath the surface of a flat display device that uses capacitive coupling of a stylus or finger. In this device, the capacitive coupling transfers position indicating signals from one wire to another which can be used to calculate the position of the coupling. Computer input tablets, as well as finger pointing mouse replacement tablets, use this technology.

In another technology, a rectangular homogenous transparent conductor is placed over the surface of a display device and bar contacts on the edges of the transparent conductor charge the conductor. Capacitive coupling of a stylus or a finger to the transparent conductor causes the conductor to discharge while sensors attached to the bar contacts measure the amount of current drawn through each of the contacts. Analysis of the ratios of the currents drawn from pairs of contacts on opposing sides of the rectangle provide an X-Y position on the panel that was selected by the user. A device of this type is described in U.S. Pat. No. 4,853,498 to Meadows, et al. An application of this device is a touch-screen display.

A similar technology uses a rectangular piece of extremely uniform resistive material with a series of discrete resistors along the edge and is mounted on a flat surface. A voltage differential is applied to the row of resistors on opposing sides of the rectangle and in a time-division manner the voltage differential is applied to the row of resistors of the other two opposing sides. The position indicating signals are either received by a stylus, or by a conductive overlay which can be depressed to contact the surface of the resistive material. One variety of this device is described in U.S. Pat. No. 3,798,370 to Hurst.

The devices described in U.S. Pat. Nos. 4,853,498 (Meadows, et al.) and 3,798,370 (Hurst) drive a homogenous rectangular resistive overlay with bar contacts or a string of resistors along each edge. These approaches rely upon the regular shape of a rectangle in order to work. The shape and placement of the contacts provide the means to detect portions of the surface within a rectangular subsection of the resistive material of the surface. Other simple shapes may also be feasible with bar and resistor string contacts but in complex shapes they can create areas that cannot be distinguished (e.g., shapes with concave edges such as a circle or ellipse can not be accommodated by either the Meadows or the Hurst approaches). The use of bar contacts or strings of resistors along substantially the entire edge of an object limits their usefulness on objects where the position on the entire surface needs to be detected. The locations directly beneath each bar electrode and between each bar or spot electrode and the edge of the object are not detectable in these devices.

The devices described in U.S. Pat. Nos. 4,853,499 (Meadows, et al.) and 3,798,370 (Hurst) do not take into consideration the effects of contact resistance. The resistance between the contacts and the homogenous resistive material may be substantial relative to the resistance of the homogenous material. Additionally the contact resistance may vary from electrode to electrode or change due to mechanical or environmental stress. The Meadows and Hurst devices rely on contacts of known, or constant resistance, which constrains the use of materials and contact approaches. Any variation in contact resistance or changes in contact resistance due to environmental factors are not accounted for and result in detection errors.

Further, Meadows loads the surface with a capacitively coupled stylus and determines position by measuring the current drawn from the driving circuits. The Meadows device requires four receiver circuits to accomplish this.

The Meadows device is susceptible to the effects of unwanted phantom styluses coupling to the surface. Phantom styluses such as rings or fingers may couple to the active surface instead of, or in addition to, the actual stylus. These phantom styluses cause detection errors because the changes that they also produce cause changes in the driving circuit.

In applications where the object containing the grid needs to be rotated, or the electronics and the object are physically spaced-apart from each other, a large number of conductors must be coupled to the system, or between the elements of the systems, through connection mechanisms that may allow rotation or other movements. Such cables for the systems of the prior art would be rather large and cumbersome. Further, connectors with a large number of contacts are expensive and reduce the overall reliability of any system that requires them. Contacts that allow rotation, such as slip rings or commutators, become prohibitively complex and expensive as the number of connections rises above a small number. Additionally, the multiple circuits required to drive grid arrays are complex and costly to manufacture. Acoustic wave detectors provide a rugged position detection mechanism but are costly to implement. Light wave detection mechanisms are limited to flat surfaces and are susceptible to dust and insects blocking the light paths. It is believed, however, that the present invention solves these problems.

In today's modern environment there are many sources of electro-magnetic energy, both naturally occurring and man-made. Some examples of the sources of such energy in the earth's atmosphere are static electricity, electrical storms, heat lightning, radiation from outer space, and man-made radio waves. Each of these acts and interacts with each other causing interference and background noise to each other, depending on the intensity of the background or interfering signal. Thus, as is well known in devices that utilize an antenna as a device to detect an input signal, these atmospheric signals may interfere with the ability to detect and receive a signal of interest. It is also known that in systems with a hand-held antenna probe, the human body acts as a larger antenna with a signal from the person holding that probe added to the signal of interest detected by the hand-held probe. That added signal, and the multiple frequencies that it includes is also known to potentially add a level of inaccuracy in such a system, if the desired signal can be detected at all. To overcome that unwanted interference many elaborate circuits have been devised to suppress those interference signals "picked-up" by the human user from impacting the performance of the system.

SUMMARY OF THE INVENTION

The present invention includes various apparatus and methods for determining a user selected position on an electrographic sensor unit. In the most general terms the electrographic sensor unit of the present invention includes a layer of a conductive material having an electrical resistivity with K spaced apart contact points electrically interconnected therewith, a processor connected to the K spaced apart contacts and disposed to selectively apply a signal to N of the K contact points where N has an integer value of 3 to K, and a probe assembly, including a stylus or a flexible conductive layer placed over the layer, coupled to the processor, the stylus disposed to be positioned by a user in vicinity of the user selected position on the layer, or the user to point a finger at the flexible conductive layer. In turn, the stylus, or the flexible conductive layer receives signals from the layer when the contact points have signals selectively applied thereto by the processor with the user selected position being determinable by the processor from the signals received from the stylus, or flexible layer, each in relation to a similar excitation of (N-J) different pairs of the K contact points under control of the processor, where J is an integer of 2 to (N−1).

Additionally, where the electrographic sensor includes more than one conductive layers that are each electrically isolated from each other, in the most general sense M conductive layers, the present invention is also able to discern which of those layers contains the user selected position. Here, each layer has K spaced apart contact points electrically interconnected with the corresponding layer of conductive material where N of the K contact points on each layer are used to locate the user selected position and where N has an integer value of three to K. The processor is similarly disposed to selectively apply a signal to each of the N contact points of each of the M layers and to determine which of the M layers and position coordinates of the user selected position on the corresponding one of the M layers in cooperation with a means for detecting and delivering a signal from the user selected position on the selected layer of the electrographic sensor unit to the processor.

The identification of the selected layer is accomplished by sequentially applying a first selected signal to all of the K contact points on each of the M layers in turn and measuring a first measured signal at said user selected position for each of the M layers individually with the first measurement corresponding to each one of the M layers being the signal received by the means for detecting and delivering when all of the contact points on that layer has the first selected signal applied to that layer's contact points.

Next, a second measured signal is measured at the user selected position on the user selected layer for each of the M layers with each of the K contact points on each of the M layers open circuited, followed by the subtraction of the second measured signal from the first measured signal for each of the M layers to form M difference values.

Those M difference values are then each compared against a preselected threshold value to determine which one of those M difference values is both greater than that selected threshold and which exceeds it by the greatest value. The layer associated with the difference value that satisfies those conditions is then identified as the layer that contains the user selected position. Then once that determination is made the coordinates of the user selected position on that layer can be determined as discussed above.

The present invention also includes techniques for compensating for contact resistance in each of the contact points on the conductive layer, as well as forming the conductive layer into a two or three dimensional shape which may be open or closed. Further, the present invention includes the placement of a conductive skin over the outer surface layer with that skin having a graphical representation thereon and the present invention having the capability to convert the position coordinates of the user selected position from the coordinates of the conductive layer to those of the graphical representation. Such a graphical representation may be that of a map or a globe, even a mythical map or one of a star or another planet. Carrying this one step further, those graphical coordinates may also be used to electronically deliver information that has been prestored in memory relative to the selected graphical coordinates to the user.

In actual application the present invention can take many forms from a conductive layer with or without a non-conductive layer thereon and a stylus for use by the user to select a position on the layer, to a multi-layer structure with a conductive bottom layer, a non-conductive compressible inner layer, and a flexible conductive top layer where the user presses the top layer toward the bottom layer and the point at which the top and bottom layers are closest together is determined to be the user selected position. Further, various designs are proposed wherein the actuation and measured signals are either AC of a selected frequency or DC.

The present invention also includes a probe assembly with a cable with two conductors. The proximate end conductor is coupled to the processor and the proximate end of the other conductor is connected to a signal neutral point. The stylus in turn is coupled to the cable and incorporates therein the distal ends of two conductors with the distal end of the conductor coupled to the processor disposed to receive signals from the layer when the contact points have signals selectively applied to them and the user positions the stylus in vicinity of a selected point on the surface. The distal end of the other conductor is disposed to be contacted by the user when holding the stylus to connect the user to the signal neutral point. To maximize the probability that the user holds the stylus making contact with the contact point, it is located externally and positioned to be contacted by the user during use of the stylus. Further improve that probability, and to increase the comfort of holding the stylus, an electrically conductive contact of a flexible conductive polymer is placed to encircle the stylus at a position to maximize the user's comfort when holding the stylus.

Thus, to fully explain the scope of the present invention, a detailed discussion of various embodiments is offered in the Description of the Preferred Embodiments below. However it must be kept in mind that that discussion is not an exhaustive discussion and variations on the many themes that are presented are also considered to be part of the present invention.

DESCRIPTION OF THE PREFERRED EMBODIMENTS

Figure 1:
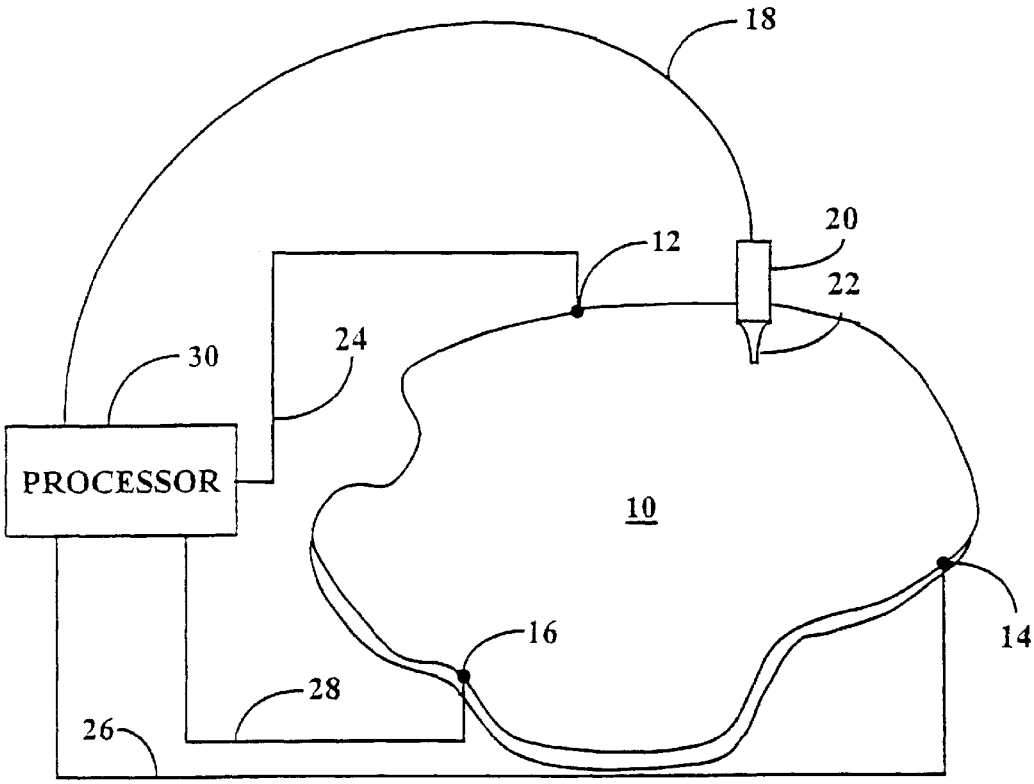
FIG. 1 is a simplified block diagram of a generalized embodiment of the system of the present invention.

The present invention relates to a system and method for determining a location on a two or three dimensional surface of any shape selected by a user, as well as providing access to data storage locations or information stored therein that is relative to that location. More specifically, the present invention determines the location information in the form of coordinates on a predefined coordinate system. That location information then serves as an address to locations within the memory of an associated microprocessor subsystem. That location, or address may in-turn be used to retrieve previously stored data pertaining to the corresponding location on the surface, to store data pertaining to the corresponding location on the surface, to modify the behavior of the system incorporating the present invention, or to be presented to the user on a conventional display or printer device.

In simple shaped surfaces, such as a rectangle, a minimum of three small electrical contacts mounted on the edge of the surface are needed. On more complex shaped surfaces the minimum number of electrical contacts may increase to enable the system to determine between multiple locations on the surface as to which one that the user is indicating. In each configuration of the surface, the contacts need to be positioned such that all locations on the surface can be individually identified.

Through the use of small contacts and driver/receiver techniques, the present invention is able to compensate for differences in the contact resistance of each of the contacts. The differences that can be compensated for include differences between contacts on the same surface, differences between the contacts on one surface versus those on another surface using the same electronics, as well as changes in the contact resistance of individual contacts over time due to mechanical and environmental stresses.

The present invention determines a user selected position on the surface by measuring the unique position indicating signals with a receiver as discussed below. For either two or three dimensional objects, the present invention only requires a single receiver circuit.

In the various embodiments of the present invention, the stylus does not load, or negligibly loads, the transmitters and a signal level at the point on the surface that is touched by the stylus is measured rather than the changes in the driving circuit as in the Meadows device. Additionally, potentially phantom styluses such as fingers and rings, that have a dramatic effect on the operation of the prior art, only have a negligible loading effect on the transmitter of the present invention. Thus the present invention is immune to phantom styluses.

In the present invention the active surface can be made of a conductive polymer composite (conductive plastic), or a conductive coating on a non-conductive material. This has substantial cost advantages over the prior art since no overlays or embedded wires are needed, and since the surface itself provides the necessary structural support. Devices incorporating the present invention would typically include a surface of a conductive polymer composite molded or vacuum formed that does not require any additional structure thus resulting in an additional cost of only the carbon-polymer material, or the applied conductive coating. Furthermore, the formation of the sensitive surface by injection molding allows for easy creation of touch sensitive complex shapes. The use of a carbon-polymer composite material as both an element in the position location system and the structural support provides a rugged and reliable system. Carbon-polymer composite materials are inherently rugged and the system of the present invention employs a single layer of such material, rather than a multi-layer system where the bonding between the layers may deteriorate and the layers separate.

A minimum of three contacts are needed to drive an entire surface of a simple object (e.g., a rectangle, circle or ellipsoid). Additional contacts may be used for complex objects or to provide increased resolution for simpler shapes rather than increasing the sensitivity of the circuitry. The low number of contacts and therefore wire count, leads to low cost, ease of manufacturing, and enables remote or moveable surface applications (e.g., a rotating globe).

An advantage to the use of a conductive polymer material for the surface is that it allows the contacts to be mounted to the back or inside of the surface, and to thereby achieve a 100% active front or outside surface.

Additionally, the present invention includes unique surface drive techniques that can compensate for unknown and variable contact resistance. Various contact types and mechanical connection mechanisms create contact resistances which vary substantially between contacts, and vary over time with mechanical and environmental stresses such as movement, temperature and aging. Other technologies rely on contacts of known, or constant, contact resistance with any uncompensated change in contact resistance resulting in position detection errors.

The present invention permits the use of various mechanisms to compensate for differences and variations in contact resistance. Each of those mechanisms may be used and each provides its own advantages. One possible mechanism involves using two electrodes as each contact, with those electrodes being close together and electrically interconnected but not touching. The first of those electrodes in this configuration is attached to the signal drive source and the second of those electrodes provides a high impedance feedback path. In this configuration the signal drive source is adjusted so that the signal level at the second electrode is of a desired value thus providing a known signal level at a known point on the surface independent of the contact resistance. The drive method here also provides automatic adjustment for changes in the resistive material over time and temperature, as well as variations in contact resistance.

A second possible mechanism has just one electrode per contact and measures the value of the resistance of each contact to the resistive material of the surface. In such a system having three contact points, A, B and C, a signal level measurement is made at point C through a high impedance path while a signal of a known level is applied between point A and point B. Similar measurements are then made at point B with the signal applied between point C and point A, and at point A with the signal applied between point B and point C. Thus, knowing the positions of the contacts on the surface and the resistivity of the surface material, the contact resistance between points A, B, and C and the surface material may be calculated as discussed below with respect to FIG. 6.

Additionally, the present invention incorporates the use of a multi-state drive sequence to provide quick measurement and on-the-fly calibration for improved accuracy. The stylus is used to make several signal measurements at a point on the surface of the object selected by the user. First a measurement is made with no signals applied to the contacts to determine a baseline DC offset and ambient noise level for the surface, for purposes of discussion here this is called DC-OFFSET. A second measurement is made with a signal applied to all of the contacts to determine the full-scale signal value, for purposes of discussion here this is called FULL-SCALE. Another measurement is then made by applying a signal to one pair of contacts to create a signal level gradient across the surface between those two points, for purposes of discussion here call this the X axis and the measured value X. A signal is then applied to another pair of contacts to create a signal level gradient in another direction, for purposes of discussion here call this the Y axis and the measured value Y. The following calculations are then made by the system to determine the selected location along the so defined X and Y axes on the surface.

$$P_x=(X-DC\text{-}OFFSET)/(FULL\text{-}SCALE-DC\text{-}OFFSET) \quad (1)$$

$$P_y=(Y-DC\text{-}OFFSET)/(FULL\text{-}SCALE-DC\text{-}OFFSET) \quad (2)$$

The actual position on the surface can then be determined from $P_x$ and $P_y$ by using a mathematical, or empirically determined, model of the signal level gradients for the surface material.

In the present invention the basic items required (i.e., the algorithm and conductive material) have been around for quite some time. The basis for the algorithm dates back centuries. Materials similar to what is suggested for the surface material here, having similar electrical properties have also been around for decades.

The basis of the algorithm of the present invention is the use of triangulation to determine the location of the point on the surface of the object. Triangulation is defined as > "The location of an unknown point, as in navigation, by the formation of a triangle having the unknown point and two known points as the vertices." (The American Heritage Dictionary of the English Language, Third Edition)

Triangulation is a basic tenet of trigonometry and its use in finding the location of a point on the surface of an object has been used for centuries. It is used in applications such as celestial navigation, surveying, the global positioning system (GPS), and seismology.

In the present invention, as is the case in triangulation, position is determined by measuring the relationship at a point of interest to two known points. The relationship is determined from the received signal level at the stylus while injecting signals of known levels at the first two fixed points. All points on the surface that would have that signal level create a line of possible positions. Another relationship is determined using another two fixed points (a different pair of contacts however one contact can be one of those that was included in the first pair of contacts) and another received signal level from the stylus. The intersection of the two lines of possible positions from the two measurements thus tells us where the stylus touched the surface. For some surfaces this may be unique, such as a two dimensional surface or a hemisphere with the contacts mounted on the edge or at the equator.

In theory any position in three dimensional space can be uniquely identified by its distance from four non-coplanar known points, while the number of known points required may be reduced in some cases if the possible positions in three dimensional space are constrained. For the purposes of the present invention the position of interest is constrained to lie on the surface of the known shape of the surface. For a shape such as a rectangle or a circle, a position on the surface may be defined by its distance from three known points on that surface, provided the known points are either all on the edge of the surface shape or not collinear. For the continuous surface shapes of spheres or ellipsoids, a position on the surface of the shape can be defined by its distance from three known points, provided the plane defined by the three known points does not include the center point of the shape. For a cylindrical shape a position on the surface can be defined by its distance from three known points, provided the plane defined by the three known points does not cross the center line of the cylinder.

Figure 8:
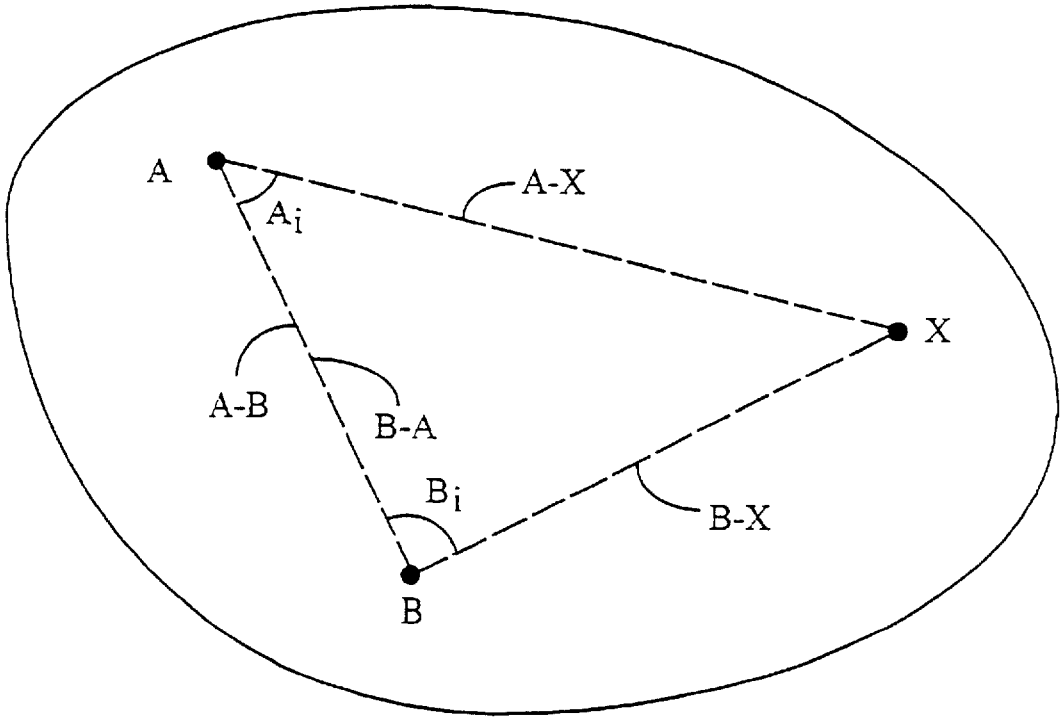
FIG. 8 illustrates the restrictions on the placement of contact points to be able to determine position with only three contacts.
Figure 9:
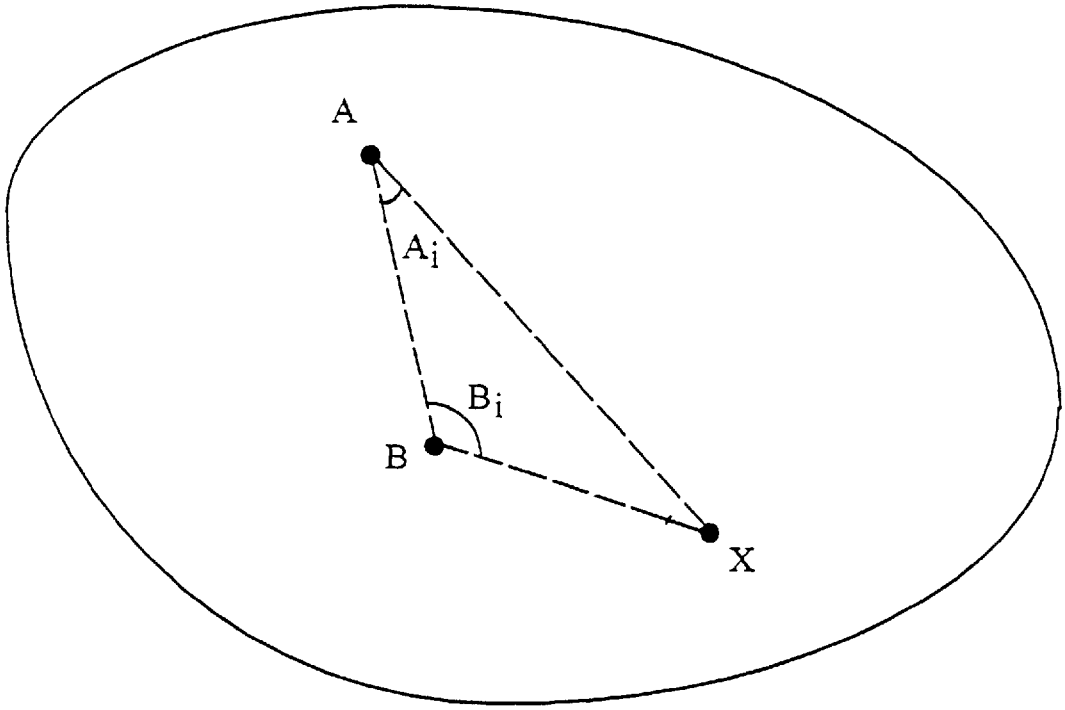
FIG. 9 illustrates three contact points that can not be used to determine position on the surface.

For a relationship to be determined between a contact and a point on the surface, the point must be in the field of view of a contact pair. That is, as shown in FIG. 8, for any point X to be in the field of view for a pair of contacts A and B, the included angle, $A_i$, between vectors drawn between A and B, and A and X, as well as the included angle, $B_i$, formed by vectors drawn between B and A, and B and X, must both be less than 90°. Additionally the surface must contain electrically conductive material between points A and X and between X and B. FIG. 9 illustrates a situation where point X is not in the field of view of points A and B since included angle $B_i$ is greater than 90° even though included angle $A_i$ is less than 90°.

In practice more contact points may be used due to the finite resolution of real measurement devices. Another factor that may increase the number of contacts is cost. A trade off may be made between the resolution of the receiver and transmitter circuits, and the number of contacts between which the signal is applied to the surface for the measurements. If more contacts are used that are closer together then the resolution of the transmit/receive circuit may be reduced.

The use of resistivity in materials to measure distance or position has been around for a number of years. An early example is the use of rotating, or sliding, potentiometers to determine the position of a knob or a slide.

Conductive polymers that could be employed by the present invention have been around at least since 1974 when CMI, an early producer of Conductive Polymer Composites, was acquired by the 3M Company.

At a minimum the materials and algorithms utilized by the present invention have been readily available for 20 years, and in all likelihood longer. However, the literature does not teach or suggest the combination of those elements to produce a device like the present invention, in fact all of the known references teach away from this technique.

In FIG. 1 the basic components of the user selected position locating system of the present invention are shown. They include a two or three dimensional conductive surface 10 (e.g., carbon loaded plastic or a conductive coating applied to a non-conductive surface) having a selected resistivity with three conductive contacts 12, 14 and 16 affixed thereto. Each of contacts 12, 14 and 16 are connected via conductors 24, 26 and 28, respectively, to processor 30. Also connected to processor 30 is conductor 18 with a stylus 20 having a tip 22 affixed to the other end thereof for the user to use to indicate a position on the surface 10 that is of interest to that user.

Figure 2:
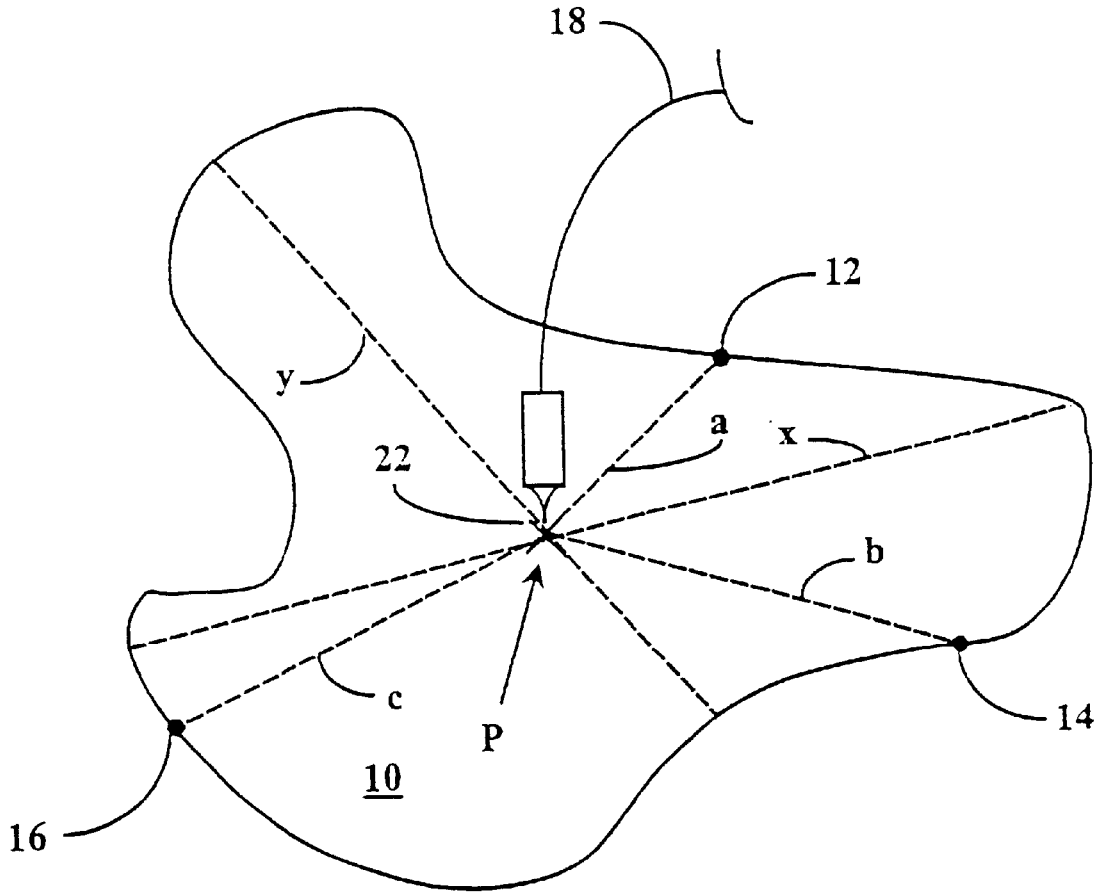
FIG. 2 is an illustration of the position location algorithm of the present invention for a two dimensional surface shape.

Then, as in FIG. 2 when a user selects a point on surface 10 with stylus 20, a series of measurements as described in general terms above are made.

First, without any signals applied to contacts 12, 14 and 16, processor 30 measures the DC-OFFSET value of the system with stylus 20;

Next an equal amplitude signal is applied to all three of contacts 12, 14 and 16, and processor 30 measures the FULL-SCALE signal value with stylus 20;

The third measurement is made by applying a signal of the amplitude used in the full-scale measurement to one of the three contacts, say contact 12 with a second contact grounded, say contact 14, and the signal measurement made with stylus 20 which will be somewhere along an equipotential line between those two contacts (i.e., line X in FIG. 2);

A fourth measurement is made by applying the signal to, and grounding, a different pair of contacts, say 12 and 16, and the signal measurement made with stylus 20 which will be somewhere along an equipotential line between those two contacts (i.e., line Y in FIG. 2), with the position of stylus 20 being the intersection of lines X and Y; and The values of $P_X$ and $P_Y$ are then calculated as in equations 1 and 2 above.

In actual operation, each of those steps can be automated by processor 30 without requiring the user to initiate specific measurements or to switch signals.

The values of $P_X$ and $P_Y$ can then be used as an address to a memory within processor 30 from which information relative to the position indicated with the stylus may be obtained. This same technique can also be used to determine the address in memory where data is to initially be stored for later retrieval, or as an address on a remote display that is to be activated for whatever purpose.

Each unique position on the surface is defined by a unique combination of values of $P_X$ and $P_Y$. From the series of measurements described above, the position of the stylus on the surface may be expressed in terms of $P_X$ and $P_Y$ which will be called the equipotential coordinates. Additional calculations may also be made to convert the position from the equipotential coordinates to another coordinate system, if desired. The conversion requires a known mapping of the equipotential coordinates to the desired coordinate system. The mapping may be determined mathematically for an object made from a homogenous conductive material or one where the resistivity distribution is known. For objects in which the resistivity distribution is not known, the mapping of equipotential coordinates to the desired coordinates may be determined empirically. In either case, the mapping may be stored in the microprocessor's memory and the conversion calculations performed by the microprocessor.

Figure 3:
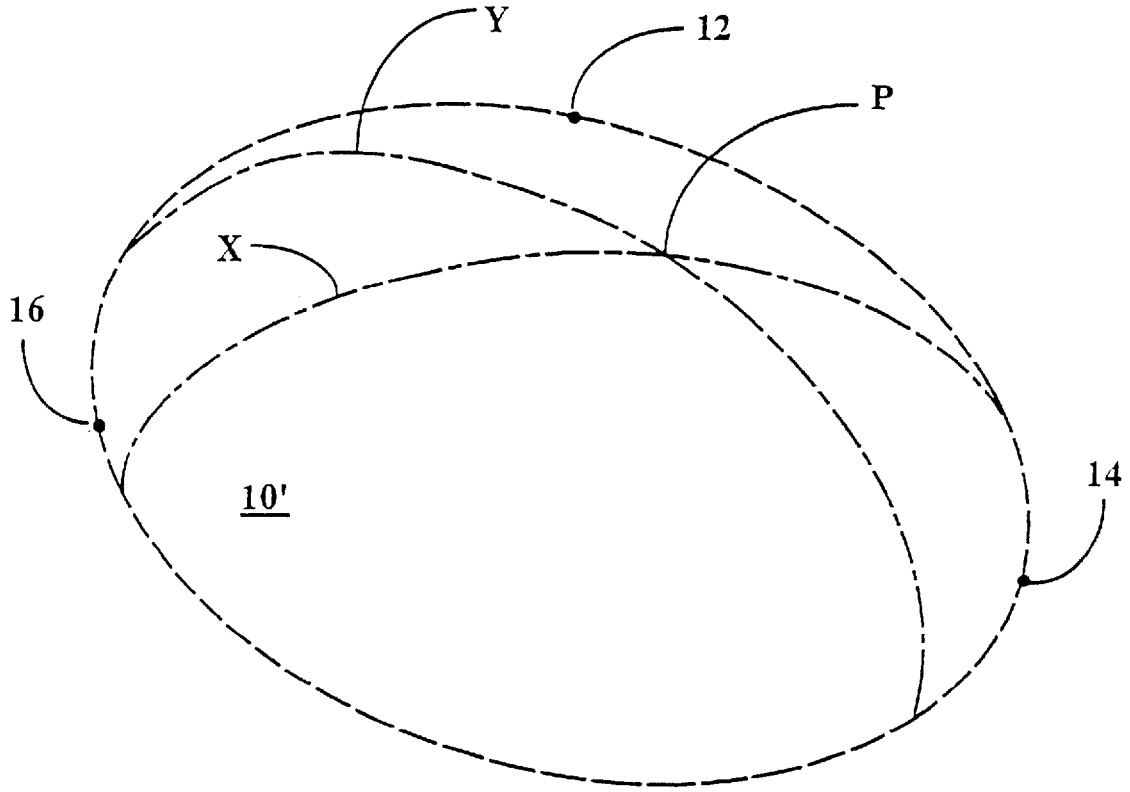
FIG. 3 is similar to FIG. 2 however the illustration is for a three dimensional shape.

FIG. 3 illustrates the same approach for determining the values of $P_X$ and $P_Y$ on the surface having a defining equation that is continuous over the entire surface, for example a hemisphere as shown.

Surface 10 of the present invention uses materials such as carbon loaded polymers or conductive coatings (e.g., 3M Velostat 1840 or 1801) that can be easily molded into, or applied to, two or three dimensional surfaces, including surfaces having complex shapes. A minimal number of drive circuits and connections between that surface and the detection electronics further will reduce the complexity in both the electronics and the mechanical aspects of coupling the surface to the electronics.

More specifically, several embodiments of the present invention are described in the following paragraphs and illustrated starting with FIG. 4.

Figure 4:
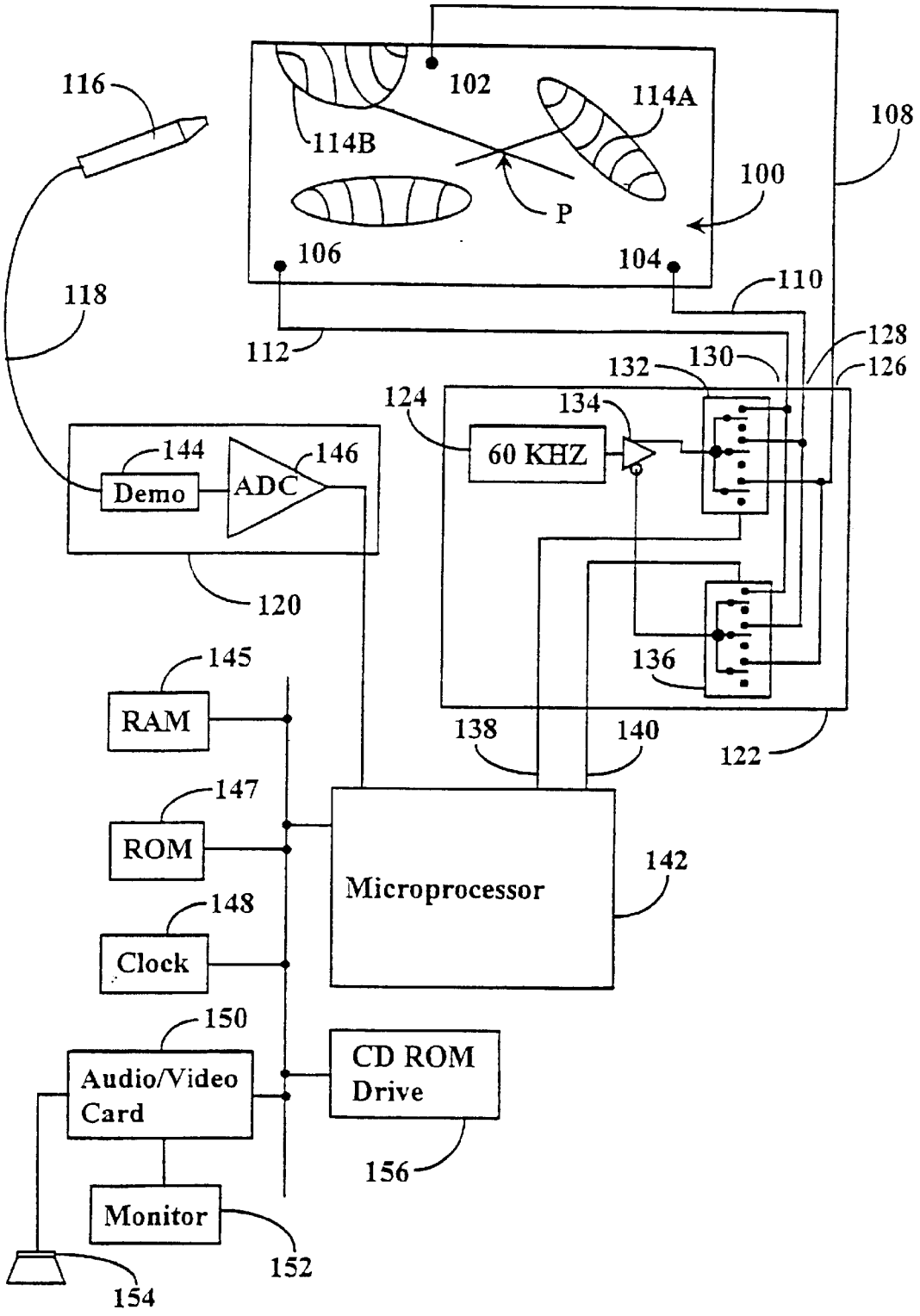
FIG. 4 is a block diagram of a first embodiment of the present invention.

The embodiment, shown in FIG. 4, includes a rectangular piece of conductive material as sheet 100 (e.g., 12 inches×12 inches×0.125 inches sheet of a carbon loaded polymer such as 3M Velostat 1801). The conductive material may also be composed of a non-conductive material with a conductive coating such as Model 599Y1249 from Spraylat Corp.

Affixed near the edge of sheet 100, and making electrical contact thereto, are contacts 102, 104, and 106. Connected between contacts 102, 104 and 106 on sheet 100 and contacts 126, 128 and 130 of signal generator 122, respectively, are electrically conductive leads 108, 110, and 112.

Signal generator 122 includes a 60 KHz AC signal generator 124 that feeds amplifier 134 with the non-inverting output terminal of amplifier 134 connected to three separate terminals (one corresponding to each of contacts 102, 104 and 106) of switch 132, and the inverting output terminal of amplifier 134 connected to three terminals (one corresponding to each of contacts 102, 104 and 106) of switch 136. Then each of contacts 126, 128 and 130 are each connected to different terminals of each of switches 132 and 136. In FIG. 4 each of switches 132 and 136 are shown in the open position (i.e., no signal applied to any of contacts 126, 128 and 130).

In turn, the position of each of switches 132 and 136 is controlled via cables 138 and 140, respectively, from microprocessor 142 to permit microprocessor 142 to select which of contacts 102, 104 and 106 receive a 60 KHz signal through switch 132 via the associated control lead and which of contacts 102, 104 and 106 receive an inverted 60 KHz signal through switch 136 via the associated control lead.

When a 60 KHz AC signal is connected to one or more of contacts 102, 104 and 106 that signal radiates through the conductive material of sheet 100 and stylus 116 acts as an antenna when brought within proximity of surface 100. A signal detected by stylus 116 is in turn conducted to the signal measurement stage 120 via shielded cable 118. In this embodiment stylus 116 is completely passive and could be fabricated as simply as consisting of a plastic shell enclosing the end of shielded cable 118 with the final ⅛ inches of cable 118, at the distal end of stylus 116, having the shielding removed to allow the center conductor of cable 118 to be exposed to receive radiated signals. Thus, when the tip of the stylus is near the surface of conductive material 100, the radiated signal is received by the stylus antenna and provided as an input signal to signal measurement stage 120.

Signal measurement stage 120 includes a demodulator 144 that is connected to cable 118 where the signal received by stylus 116 is demodulated and the demodulated signal is then in turn presented as a signal level to an analog-to-digital converter (ADC) 146. ADC 146 then digitizes that signal level and presents it to microprocessor 142.

The use of an AC signal in this embodiment makes it possible for stylus 116 to receive signals radiated from the conductive material of sheet 100 without being in direct contact with the conductive material of sheet 100. This allows the conductive material of sheet 100 to be covered with a layer of a non-conductive material for protection from inevitable striking of the surface of sheet 100 with stylus 116, or for placement of application specific graphics over the touch surface, and still allow stylus 116 to act as an antenna to receive a signal from sheet 100 at a selected point that is to be measured by the signal measurement stage 120.

Microprocessor 142 is encoded to direct the performance of a series of measurements with different sets of contacts 102, 104 and 106 connected to receive the 60 KHz signal, or the inverted 60 KHz signal.

Once a user has selected a position on sheet 100 of interest, the system of the present invention performs a series of measurements in rapid succession (e.g., by time-division multiplexing) to determine the location to which stylus 116 is pointed and to provide the user with the information that is sought.

The first measurement, as outlined above, is here called $\text{Signal}_{OFFSET}$, and involves setting switches 132 and 136 to the all open positions. Microprocessor 142 then reads the signal level from signal measurement stage 120 and assigns that value to $\text{Signal}_{OFFSET}$ and saves that value in RAM 144.

The second measurement, as outlined above, is here called $\text{Signal}_{FULL}$, involves connecting a 60 KHz AC signal to all of contacts 102, 104 and 106 at the same time by the closure of all three sets of contacts in switch 132. Microprocessor 142 then reads the signal level from signal measurement stage 120 and assigns that value to $\text{Signal}_{FULL}$ and saves that value in RAM 144.

Next, microprocessor 142 selects a pair of contacts, say 102 and 104, for use in the next measurement. Contact 102, for this discussion is point A and is connected to receive the 60 KHz AC signal via switch 132. The other of those two contacts, contact 104, which for this discussion is point B is connected to receive the inverted 60 KHz AC signal via switch 136. The third contact 106 is merely connected to open switch sections in both of switches 132 and 136. Microprocessor 142 then stores the signal level from signal measurement stage 120 in RAM 144 and assigns that value the name $\text{Signal}_{RAW\text{-}AB}$.

Between the energized contacts 102 and 104, a signal level equipotential map 114A could be drawn due to the effect of the distributed resistance in the conductive material of sheet 100. Signal equipotential maps such as 114A, 114B, and 114C, including the shape and values of the equipotential signal level lines, are stored in ROM 146. As discussed in Electromagnetics, by John D. Kraus and Keith R. Carver, McGraw-Hill, 1973, pp 266–278, these signal equipotential maps are created by finding the unique solution to Laplaces equation ($\nabla^2 V=0$) that satisfies the boundary conditions of sheet 100 and each pair of contacts. There are many methods of finding the solution to Laplace's equation for an object, including, but not limited to, direct mathematical solutions, graphical point-by-point computer modelling, and empirical determination. For homogenous conductive material and simple shapes, a direct mathematical solution may easily be obtained. For materials whose homogeneity, shape or contact placement do not lend themselves to other methods, empirical determination may be used.

In the empirical determination method, a coordinate system is chosen and overlaid on the device. To determine the map for a specific pair of contacts, such as 102 and 104, the contacts are energized in the same manner as for measuring $\text{Signal}_{RAW\ AB}$ above. At each cross point on the chosen coordinate system the value of $\text{Signal}_{RAW\ AB}$ is measured. If the chosen cross point granularity is sufficiently fine the equipotential map may be extracted directly by finding the points that contain the same measured value. Otherwise the equipotential lines may be calculated by interpolating between measured points.

For the third measurement, microprocessor 142 selects another pair of contacts, such as 102 and 106. Contact 102, as discussed above will again be referred to as point A, is connected to receive the 60 KHz AC signal via switch 132 and is the only one of the contacts so connected. The other contact 106, which for this discussion is referred to a point C, is connected to the inverse 60 KHz signal via switch 136. Microprocessor 142 then records the signal level from signal measurement stage 120 and assigns that value the name $\text{Signal}_{RAW\text{-}AC}$.

The two signals, $\text{Signal}_{RAW\text{-}AB}$ and $\text{Signal}_{RAW\text{-}AC}$, are affected not only by the material resistance between the contacts but by a number of other factors including the altitude of stylus 116 from the surface of the conductive material of sheet 100, the attitude or angle of stylus 116, and changes in the circuitry from environmental changes, aging, or other factors. The signal, $signal_{FULL}$, is similarly affected by altitude, attitude, and circuitry changes but has a constant signal equipotential map, thus the value of $Signal_{FULL}$ may be used to normalize the values of $Signal_{RAW\text{-}AB}$ and $Signal_{RAW\text{-}AC}$ to remove the effects of altitude, attitude, and circuitry changes using the following formula.

$$Signal_{NORM}=Signal_{RAW}/Signal_{FULL} \quad (3)$$

Both $Signal_{RAW}$ and $Signal_{FULL}$ are affected by certain changes in the circuitry that produce a DC offset in the final values. Equation 3, if desired, may be modified to remove those effects as shown in equation 4 below.

$$Signal_{NORM}=(Signal_{RAW}-Signal_{OFFSET})/(Signal_{FULL}-Signal_{OFFSET}) \quad (4)$$

Applying either formula of equations 3 and 4 to each of $Signal_{RAW\text{-}AB}$ and $Signal_{RAW\text{-}AC}$, the normalized signals, $Signal_{NORM\text{-}AB}$ and $Signal_{NORM\text{-}AC}$, can be derived.

For example, using the predetermined signal map 114A and the value $Signal_{NORM\text{-}AB}$, the position of stylus 116 may be resolved to a single signal level line, such as 115, between contacts 102 and 104.

Using the predetermined signal map 114B and the value $Signal_{NORM\text{-}AC}$, another signal level line in the signal map 114B can be determined between contacts 102 and 106. The position of stylus 116 is then resolved to the point, P, where the signal level line selected by $Signal_{NORM\text{-}AB}$ in 114A crosses the signal level line selected by $Signal_{NORM\text{-}AC}$ in 114B.

The use of the resolved point, P, is qualified by microprocessor 142 by comparing the value of $Signal_{FULL}$ to a predetermined threshold level to determine if the received signal is valid. This threshold is generally determined empirically to satisfy the resolution requirements of the application or the user. As the altitude of stylus 116 from the surface of the conductive material of sheet 100 is reduced, the received signal is stronger and the resolution of the position is more precise. Some applications such as drawing tablets, may want a specific altitude threshold in order to match user expectations of operation. In these applications, users do not expect the system to acknowledge the stylus position until the tip is in contact with the surface. Other applications may desire a higher or lower degree of resolution. The application may select the altitude threshold that best matches it's requirements. When a $Signal_{FULL}$ threshold for a particular application is satisfied the resolved point, P, is considered valid.

The measurements outlined above are made in succession and each measurement can typically be made within 4 msec so the entire sequence is completed in 12–16 msec. This is important since the measurement sequence needs to be completed quickly so that any stylus position changes between the measurements are minimized. Substantially faster sample times may be used provided that the capabilities of the signal measurement device are selected accordingly.

To support an application that requires a series of stylus locations in quick succession to be measured, a sample time that is substantially faster than the movement of the stylus needs to be chosen. An application that would require successive stylus location detection would be an electronic drawing pad where the succession of points would form a line. An application of this type may require sample times on the order of 200 microseconds.

In the embodiment discussed above, signal generator 122 produces a 60 KHz AC signal, however, a DC voltage level could alternatively be used. With a DC signal level in lieu of the 60 KHz signal the ability to detect the position of the stylus without making contact between stylus 116 and the conductive material of sheet 100 is eliminated. Since direct contact is made between the stylus and the material, the effects of the altitude and attitude of the stylus no longer contribute to the measurement of $Signal_{RAW}$ since stylus altitude and attitude are the dominant source of variation in the measurement of $Signal_{RAW}$. The elimination of stylus altitude and attitude from the measurement reduces, or eliminates, the need to normalize $Signal_{RAW}$ with $Signal_{FULL}$.

More measurements (contacts 104 to 106, i.e., B to C) may also be made to refine/confirm the point to which stylus 116 is being pointed with a minimum number of measurements. Microprocessor 142 could also be programmed to filter measurements to dampen changes made by movement of stylus 116 and to increase resolution.

Synchronous detection techniques in the receive demodulator substantially improve noise immunity. The received signal is multiplied by the transmitted signal with a FET switch (e.g., DG441). The resulting multiplied signal is then integrated to determine the DC component. It is the integrated signal that is presented to the ADC for conversion. The net effect of the multiplication and integration is that only received signals of the same frequency and phase to the transmitted signal are seen. Such signals are considered to be synchronous with the transmitter, and therefore the name synchronous demodulation. Effective noise immunity is accomplished since, in general, sources of noise will not be synchronized to the transmitter, and therefore will not be seen after multiplying and integrating. Only the desired portion of the transmitted signal that has been detected by the receiving stylus will be measured.

Special techniques can be used to enhance the accuracy near the edges of a conductive surface. On surfaces of certain shapes, the lines of equipotential may be nearly parallel near the edges, which tends to reduce the positional accuracy. Distance to the edge can be estimated from $Signal_{FULL}$ alone, since $Signal_{FULL}$ tends to fall off somewhat near the edge. Applying an estimate of the distance from the edge to point determined by the intersection of two equipotential lines near the edge can help improve positional accuracy in some cases.

In cases where two electrically isolated surfaces terminate along the same edge, such as the equator on a globe made of isolated Northern and Southern hemispheres, similar techniques can be used to improve positional accuracy near the edge. In such cases distance from the edge can be estimated by comparing $Signal_{FULL}$ from both surfaces, and using the ratio of $Signal_{FULL\text{-}A}$ to $Signal_{FULL\text{-}B}$ to help eliminate the effects of altitude and attitude.

Once the position indicated by the user is determined, the system might be employed in an application where information relative to that position has been prestored, or is to be stored, in the overall system. To enable that application, RAM 144, ROM 146, audio/video card 150 and CD ROM drive 156 are shown interfacing with microprocessor 142 via a data bus. For example, if surface 100 has an overlay of a map there may be information prestored in ROM 146 or on a CD in CD ROM drive 156 that can be delivered to the user in either audio or visual form via audio/video card 150 and speaker 154 or monitor 152.

The contact resistance of the connections between contacts 102, 104 and 106 and the conductive material of sheet 100 may play a significant role in defining the absolute signal levels in the signal maps (114A, 114B and 114C). That contact resistance affects the absolute value of the signal level but has only a minor effect on the shape or distribution of signal lines. In some cases the contact resistance between one contact and the conductive material of sheet 100 may be of a similar, or a higher, value than the resistance through the conductive material between different contacts. The resistance between a single contact and the conductive material is also subject to change over time due to chemical, or mechanical factors. Contact to conductive material resistance may also differ from unit to unit in a manufactured product.

Figure 5:
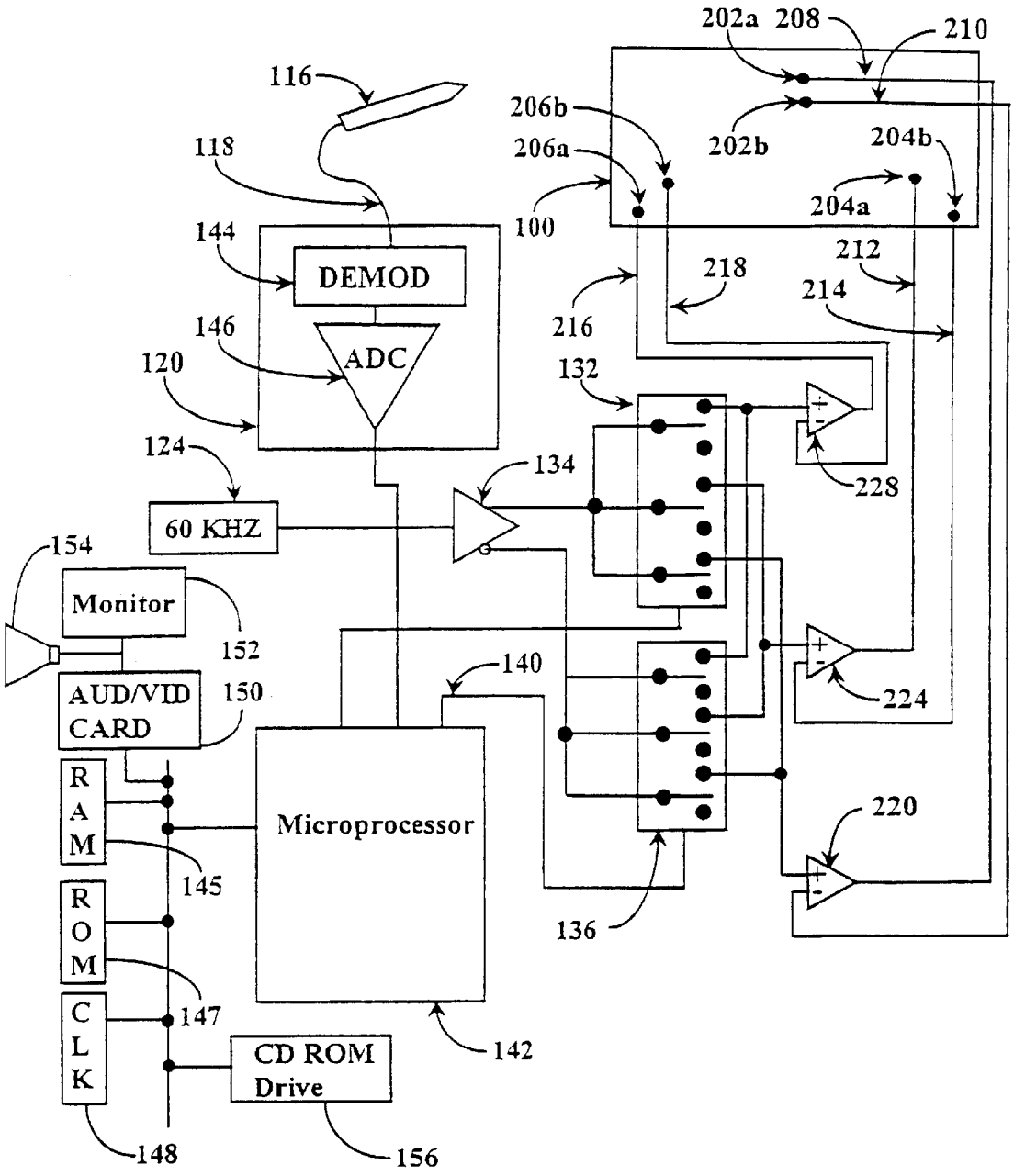
FIG. 5 is a block diagram of a second embodiment of the present invention.

To automatically compensate for contact-to-conductive material resistance differences, which is addressed in the embodiment of FIG. 4 by calculation, another embodiment of the present invention is shown in FIG. 5. As can be seen by the comparison of FIGS. 4 and 5 many of the elements of the two circuit embodiments are the same and connected together in the same way, in particular, sheet 100, the signal measurement stage 120, microprocessor 142 and associated components, signal generator 124, amplifier 134, and switches 132 and 136. The additional elements in FIG. 5, which are described below, have been added to provide the automatic compensation for resistance differences mentioned above.

The first difference between the two figures is in the structure of the contacts affixed to sheet 100. In FIG. 5, stated in simple terms, a single contact as shown in FIG. 4 is replaced with a connected pair of contacts. A first contact of each connected pair is used as the point to which connection of the signal generator is made, while the second contact of the connected pair is used as the point at which measurements of the signal level is made and at which adjustments of the signal level being injected at the first contact in that connected pair is made so that the signal level at the measured point is at a known level.

For example, contact 102 in FIG. 4 is replaced with connected pair 202a and 202b in FIG. 5. In this embodiment contact 202a could be a 0.0625 inches diameter contact positioned at the same point on sheet 100 as contact 102 in FIG. 4, and is used as the injection point of a signal into the conductive material of sheet 100. Similarly, contact 202b could be a 0.0625 inches diameter contact positioned 0.25 inches from contact 202a and used as the point at which the signal level is measured at the associated point on sheet 100.

The second difference from the embodiment of FIG. 4 is the connection of the output terminal of each of two input terminal amplifiers 220, 224 and 228 (e.g., MC4558) to contacts 202a, 204a and 206a, respectively. Each of amplifiers 220, 224 and 228 has the positive input terminal connected to a different one of the output terminals of switches 132 and 136. Each of amplifiers 220, 224 and 228 has the negative input terminal connected to a different one of the "b" contacts of each connected pair attached to sheet 100 (i.e., contacts 202b, 204b and 206b).

When the input signal passes through the resistance of the contact, the signal level decreases. If the resistance of the contact changes, the signal level changes inversely proportionally to the change in resistance of the contact. Therefore if such a change in the input signal level is inversely compensated for in another way, any change of signal level resulting from a change in the resistance of a contact is negated. Persons skilled in the art of closed loop feedback theory will recognize that the "b" contacts of sheet 100 provide feedback to the "a" contact drive amplifier 202A, 204a and 206a, such that those amplifiers can sense any decrease in signal level due to contact resistance, and provide the necessary signal boost to compensate for loss.

An alternate mechanism for compensating for contact resistance is to determine the current value of the contact resistance and adjust the absolute values in the signal map based on any change in contact resistance value. The embodiment shown in FIG. 6 performs that function.

Figure 6:
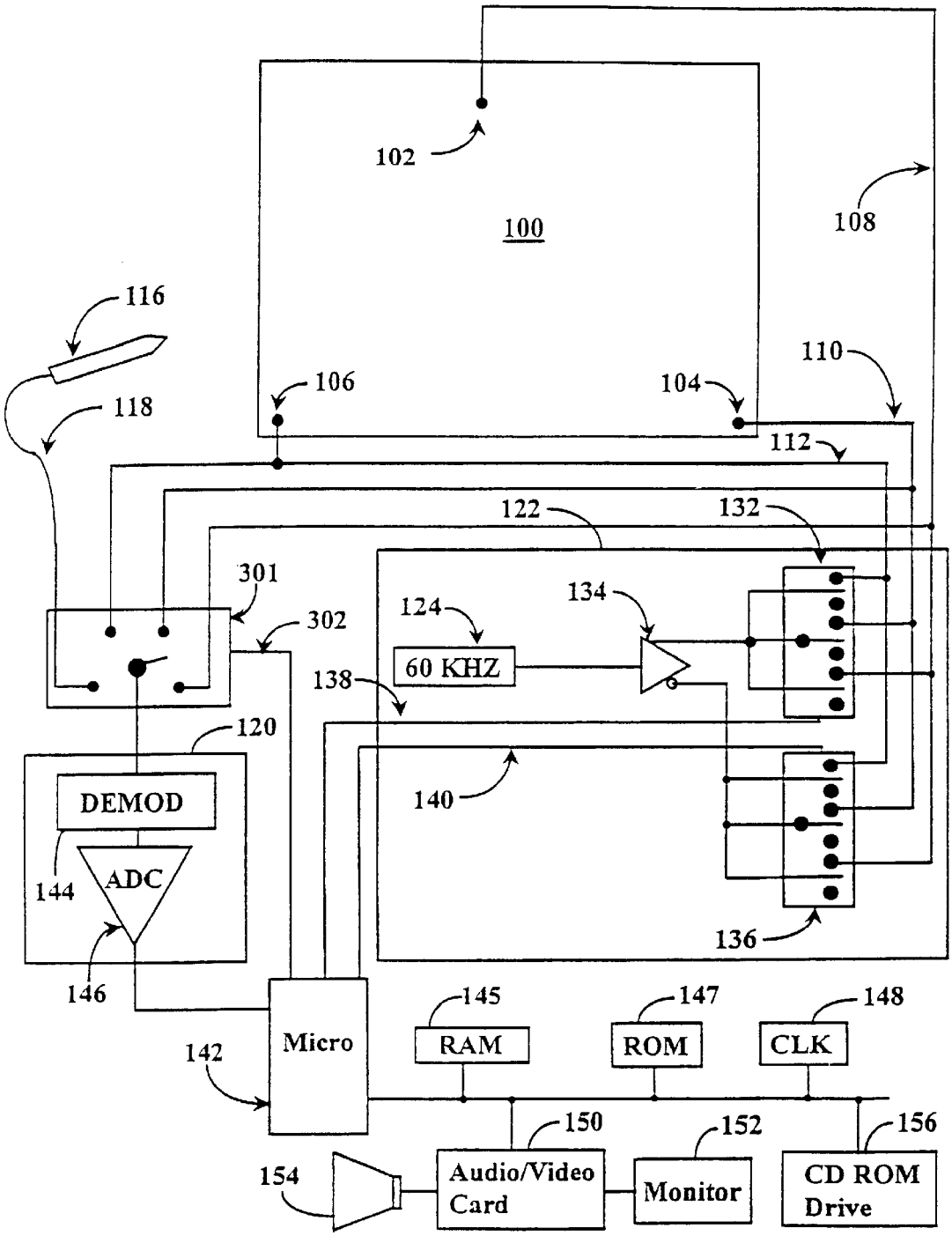
FIG. 6 is a block diagram of a third embodiment of the present invention.

Again comparing the embodiments of FIGS. 4 and 6, several similarities can be noted which include sheet 100 with contacts 102, 104 and 106, stylus 116 and shielded cable 118, signal measurement stage 120, microprocessor 142 and associated components, and signal generator 122. The new component here is four position switch 301 which provides selectability as to which signal is input to the input terminal of demodulator 144 of the signal measurement stage 120 under control of microprocessor 142 via line 302. The four potential signal input sources are stylus 116 and any one of contacts 102, 104 and 106 on sheet 100.

For any position in the signal map between two points, any change in the resistance of any contact through which current is flowing will modify the signal value observed. For example, for a predetermined, or calculated, signal map such as 114A between contacts 102 and 104 in FIG. 4, a change in the contact resistance at contact 102 will change the absolute values in the signal map but not the distribution or shape of the signal map. If the contact resistance at 104 were to change and the new contact resistance measured, the microprocessor could adjust the predetermined, or calculated, signal map to compensate for the changed contact resistance.

To measure and calculate the contact resistance changes at the three contacts 102, 104, and 106 in FIG. 6, three additional measurements are made. These measurements may be added to the sequence of measurements of $Signal_{FULL}$, $Signal_{OFFSET}$, $Signal_{RAW\text{-}AB}$ and $Signal_{RAW\text{-}AC}$. For this discussion the contacts will be designated A, B, and C for contacts 102, 104, and 106. For the first additional measurement the microprocessor selects contact 102 to be connected to the 60 KHz AC signal via switch 132, and contact 104 to be connected to the inverted 60 KHz AC signal via switch 136. The signal measurement device is connected to a fixed location, contact 106, via switch 301. The microprocessor then stores the signal level from the signal measurement stage in RAM as $Signal_C$.

The second additional measurement is made with contact 102 connected to the 60 KHz AC signal and contact 106 connected to the inverted 60 KHz AC signal. The fixed point, contact 104, is connected to the signal measurement device. The microprocessor then stores the signal level from the signal measurement stage in RAM as $Signal_B$. The third measurement is made with contact 104 connected to the 60 KHz AC signal and contact 106 connected to the inverted 60 KHz AC signal terminal of amplifier 134. The fixed point, contact 102, is connected to the signal measurement device. The microprocessor then stores the signal level from the signal measurement stage in RAM as $Signal_A$.

Thus, the measured signal levels can be defined by equations 5a–5c:

$$Signal_C = Signal_{IN}[(X \cdot R_{AB} + R_A)/(R_A + R_{AB} + R_B)] \quad (5a)$$

$$Signal_B = Signal_{IN}[(Y \cdot R_{AC} + R_A)/(R_A + R_{AC} + R_C)] \quad (5b)$$

$$Signal_A = Signal_{IN}[(Z \cdot R_{BC} + R_B)/(R_B + R_{BC} + R_C)] \quad (5c)$$

where:

$Signal_{IN}$ is the signal level injected between two contacts;

$R_{AB}$, $R_{AC}$ and $R_{BC}$ are the bulk resistances of the material between contacts A and B, A and C, and B and C, respectively;

X, Y, and Z define the distribution of the bulk resistance as seen at the measurement point, between the two drive contacts; and $R_A$, $R_B$, and $R_C$ are the contact resistances at contacts A, B, and C, respectively.

The values of $Signal_{IN}$, X, Y, Z, $R_{AB}$, $R_{AC}$, and $R_{BC}$ are constant values that may be measured and/or calculated for a particular device and stored in the microprocessors memory. That leaves a series of three simultaneous equations with three variables, i.e., $R_A$, $R_B$, and $R_C$. The microprocessor then can solve those simultaneous equations for the values of $R_A$, $R_B$, and $R_C$, and then the microprocessor can adjust the signal value tables based on the new values of $R_A$, $R_B$, and $R_C$.

An alternate mechanism to driving a pair of contacts and sensing with a receiver connected to the stylus is to use the stylus and one of the contacts as the driving mechanism and to perform sensing with one of the other contacts. A sequence of measurements could be made where another contact is selected as the drive contact and yet another contact is selected as the sense contact.

An alternate drive and measurement method is provided by the use of frequency division multiplexing. Previously discussed methods include a series of measurement steps separated in time. In a frequency division multiplexing method, pairs of contact points are driven simultaneously with different frequency signals. Therefore the signal received by the stylus is a composite of those different frequency signals and thus is distributed to multiple independent signal measurement devices (i.e., sorted by frequency) that each measure the corresponding signal simultaneously. The multiple measurement devices in this embodiment are designed to measure signals within narrow frequency bands. This measurement method offers the possibility of measuring the position in less time however with a more complicated signal drive and measurement detection system.

Several design tradeoffs may be made in the implementation of the present invention for use in a specific device. To enhance resolution a higher resolution signal generation and measurement scheme may be used. Alternately the number of contact points may be increased and an enhanced algorithm implemented that uses subsets of the contact points to resolve stylus touches on different areas of the surface. Another alternative might be the selection of a conductive material and manufacturing method that provides a more homogenous resistivity in the surface. This increases the resolution and allows for calculated, rather than measured signal maps. If the material used is not homogenous, another way that higher resolution may be accomplished is by measuring a more comprehensive signal map that is stored in the microprocessor memory.

The embodiments described in FIGS. 4, 5, 6, and 7 include a stylus that is tethered to the rest of the detection system by conductor 118. This conductor may be replaced with a communications link that does not require tethering the stylus to the system with a conductor. A low power RF transmitter could be embedded or attached to the stylus and a compatible RF receiver attached to the signal measurement means. The RF transmitter and receiver would then implement the communications link that conductor 118 provided.

The present invention may be extended to include other two and three dimensional shapes, both with a surface shape that smoothly changes slope (e.g., a sphere or a saddle shape) and shapes with sharp edges (e.g., a cube or a pyramid) so long as the resistive surface is continuous through those changes of slope and around those sharp edges.

Figure 7:
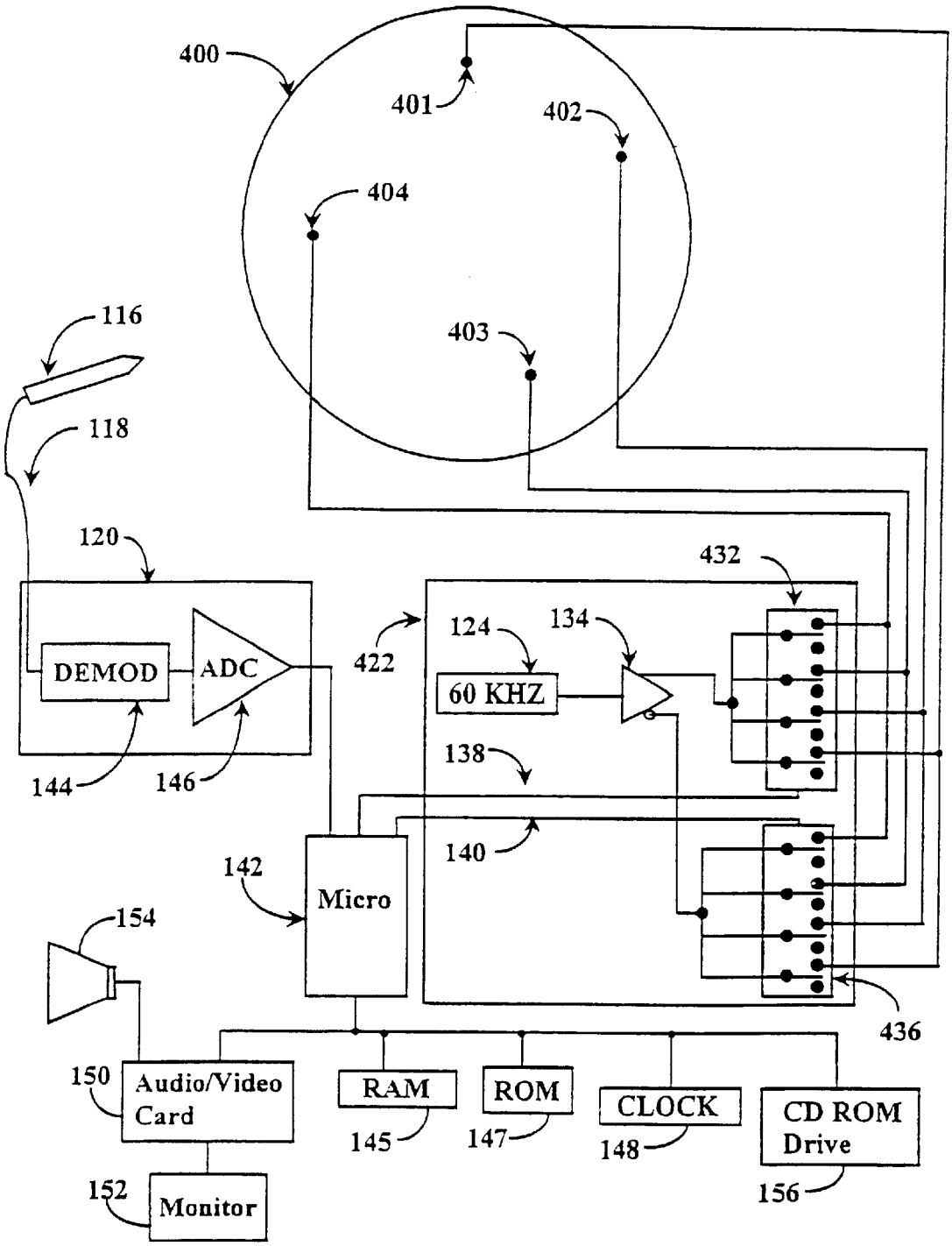
FIG. 7 is a block diagram of a fourth embodiment of the present invention.

In another embodiment as shown in FIG. 7, the position of stylus 116 on a sphere may be detected. In this embodiment a sphere 400, molded from a conductive material of the same type discussed for each of the other embodiments, has four contacts 401, 402, 403 and 404 attached to it. In order to be able to individually distinguish each point on the surface of a closed three dimensional shape (e.g., a sphere) the contacts must be positioned such that each plane defined by each possible combination of any three of those contact points does not pass through the center of the sphere. How close these imaginary planes can come to the center of the sphere (i.e., the placement of the contacts) is determined by the resolution of the signal measurement device and the precision of the predetermined, or calculated, signal equipotential map that determines the point to which the stylus is pointed.

The calculation of position is therefore substantially the same as discussed with respect to a pair of contacts thus that discussion and the claims also include this variation.

To resolve the position of stylus 116 on the two dimensional area of the rectangular sheet 100 in the embodiment of FIG. 4, three measurements, $Signal_{FULL}$, $Signal_{RAW\text{-}AB}$, and $Signal_{RAW\text{-}AC}$ were required since, as described above with respect to FIG. 2, the equipotential lines for each of the AB and AC measurements can only cross in one point. For a sphere as in FIG. 7, however, four measurements are required to fully resolve the position. For example, if contact 401 is point A, contact 402 is point B, contact 403 is point C and contact 404 is point D, a measurement of $Signal_{FULL}$ with all four points driven simultaneously is one measurement, and three measurements from the six possible pair combinations of the four contacts must be made, namely three of the possible measurements $Signal_{RAW\text{-}AB}$, $Signal_{RAW\text{-}AC}$, $Signal_{RAW\text{-}AD}$, $Signal_{RAW\text{-}BC}$, $Signal_{RAW\text{-}BD}$, or $Signal_{RAW\text{-}CD}$. Calculating the three $Signal_{NORM}$ values as in equation (3) above and plotting those values on the applicable signal maps will uniquely resolve all points on the sphere. When two $Signal_{NORM}$ values are plotted, the equipotential lines intersect in two places on opposite sides of the sphere. The third $Signal_{NORM}$ value is used to determine which of the two intersect points is the one to which the stylus is being pointed. Specifically, if the signal measured at the fourth point where used with the signal from one of the other two points that were used to locate the first two alternative points, that combination would also result in two possible points on the sphere, however, one of those two points would correspond with one of the two previously determined points and it is that corresponding point that is the actual point of interest on the sphere.

Figure 10:
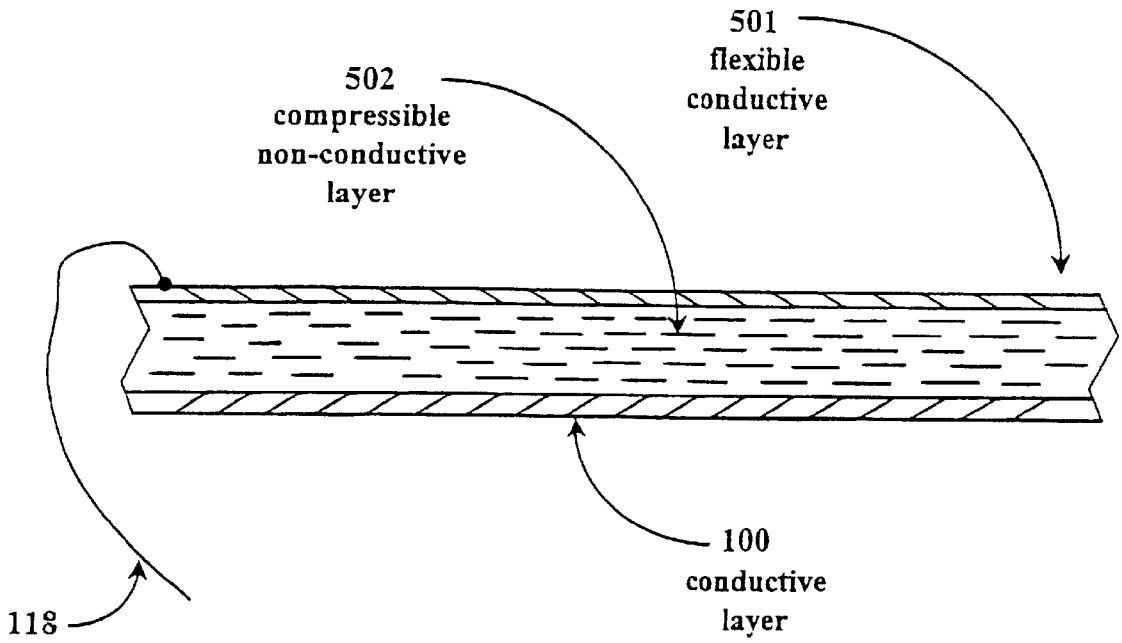
FIG. 10 is a partial embodiment wherein a multi-layer compressible touch surface is disclosed in lieu of the use of a stylus as, for example, in FIG. 4.

An alternative to using a stylus as the pointing device is the use of a finger as the pointing device. To enable this, a multi-layer material constructed with the inner layer being similar to the conductive material discussed in the previous embodiments may be used. Such a surface is illustrated in FIG. 10 with conductive layer 100 on the bottom, a flexible conductive layer 501 on top (e.g., a metal foil or a thin layer of a conductive polymer), and a compressible non-conductive layer 502 (e.g., silicon rubber or plastic foam) in-between layers 100 and 501. Outer layer 501 may be metal, or some conductive material.

In this configuration, outer conductive layer 501 replaces the attached stylus 116 as in FIG. 4 with outer layer 501 connected to the signal measurement device by conductor 118 (e.g., see FIG. 4). Thus, when a user touches outer layer 501, the middle non-conductive layer 502 compresses and conductive outer layer 501 is brought closer to conductive inner layer 502. In that situation, the signal level received by outer layer 501 from the radiated signals on inner layer 100 increases in much the same way as the signal level received by stylus 116 increases as the altitude of stylus 116 is decreased relative to surface 100 in FIG. 4. In the embodiment that utilizes the multi-layer surface, the position of the user's finger would be calculated in the same way as the location of the stylus with a threshold value chosen for $Signal_{FULL}$ in the signal valid determination step that corresponds to a fully depressed outer layer.

Figure 11:
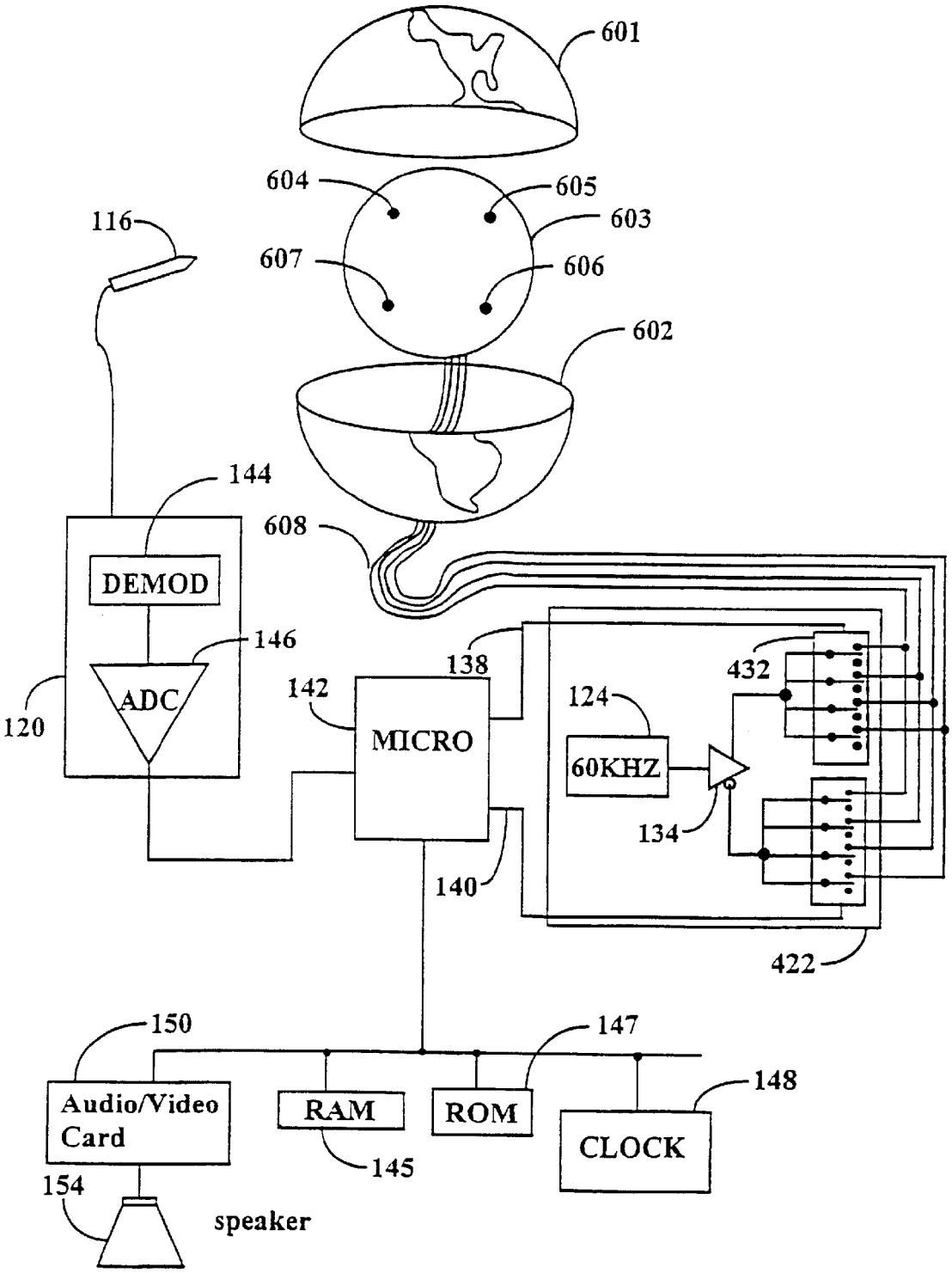
FIG. 11 is a schematic representation of an embodiment of the present invention adapted to be an interactive globe that incorporates a spherical conductive surface.
Figure 12:
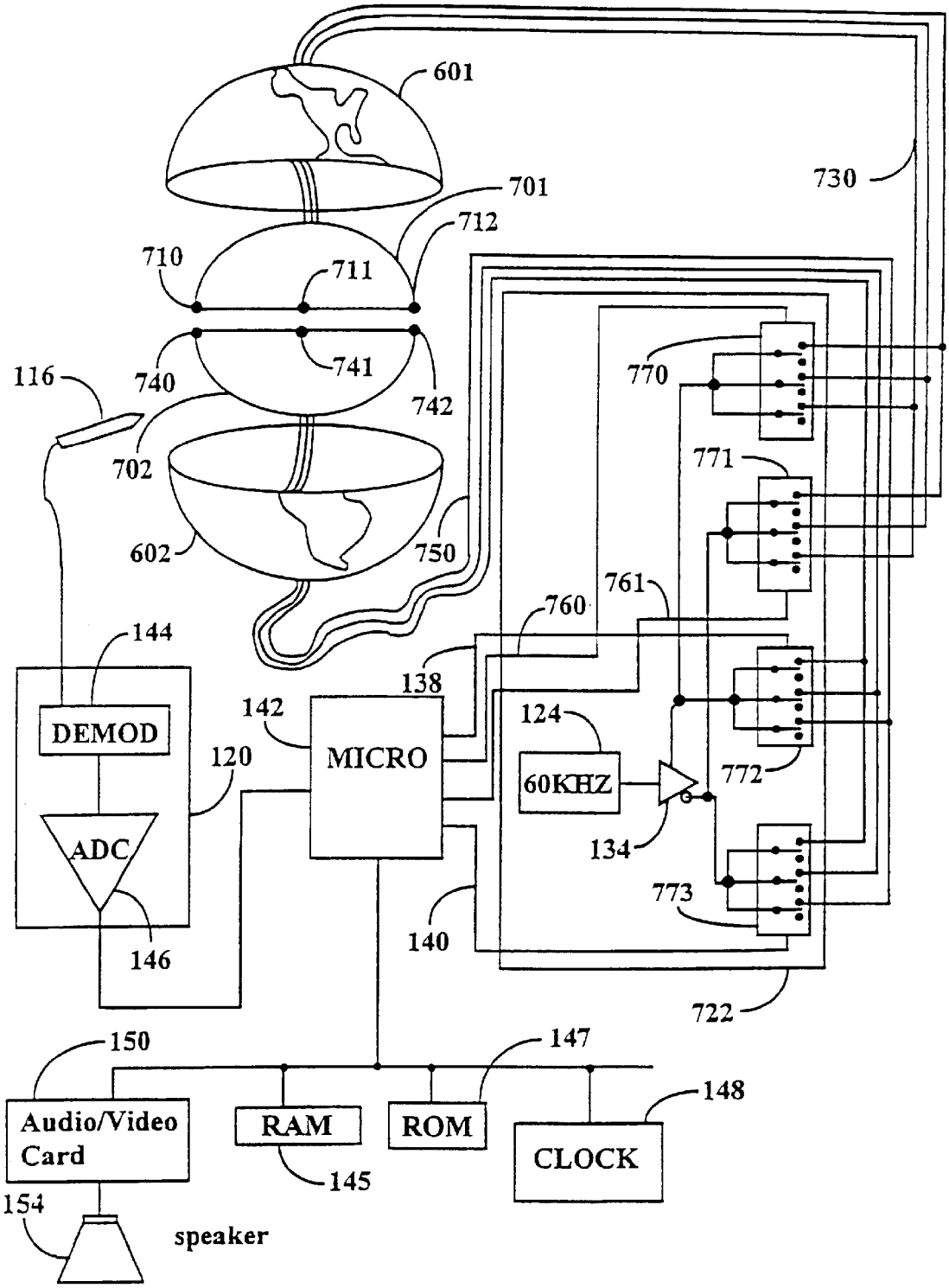
FIG. 12 is a schematic representation of an embodiment of the present invention adapted to be an interactive globe that incorporates two hemispherical conductive surfaces.

As mentioned briefly above with respect to FIG. 4, one application of the present invention might be an interactive globe of the earth, the moon, one of the planets, one of the stars, or even an artificial body or planet for an interactive game. Two potential implementations of such a globe are illustrated in FIGS. 11 and 12. The primary differences between the embodiments of those figures is that in FIG. 11 the conductive surface is a sphere, and in FIG. 12 the conductive surface is implemented with two hemispheres.

FIG. 11 illustrates the system disclosed above with respect to FIG. 7 being modified to be a world globe. Thus, the electronics in the lower portion of FIG. 11 have the same reference numbers as, and operate in the same way described, in FIG. 7. In FIG. 11 there is a conductive sphere 603 with four contact points 604, 605, 606 and 607 on the inside of sphere 603, with each of the contact points connected, respectively, to one of the four insulated conductors of cable 608 at one end of those conductors. Cable 608 exits sphere 603 through a small hole in the bottom of sphere 603 with the other end of the conductors of cable 608 interconnecting with the corresponding sections of switches 422 and 432.

To provide the geographic details of the globe, two vinyl skins 601 and 602, shown here as representing the northern and southern hemispheres of the earth, are placed over sphere 603. Thus when a user uses stylus 116 to point to a location on the globe, the electronics determines the coordinates of that selected location as described above in the discussion with respect to FIG. 7 since the electronics here are as described there. The unique location on the surface of the globe is thus defined by the equipotential coordinates which can then be mapped by microprocessor 142 (e.g., by means of a look-up table) into global coordinates (e.g., longitude and latitude) that correspond to the selected position on the globe.

A database containing features of interest in the world, such as country locations and names, capitals, and populations can be prestored in RAM 144 relative to what ever coordinate system is desired. Thus, when a user selects a point on the globe with stylus 116, microprocessor 142 determines the coordinates of that position and causes the retrieval of information relative to that position from the database to be presented to the user via, for example, audio/video card 150 and speaker 154.

An alternative implementation of a world globe is illustrated in FIG. 12 where conductive hemispheres 701 and 702, that are electrically isolated from each other, provide the conductive surfaces for the globe. Here hemispheres 701 and 702 are bonded together with their edges in close proximity to each other with one continuous, or several (e.g., three) rigid, non-conductive spacer(s) affixed to the edges of each of hemispheres 701 and 702 to maintain the spaced-apart relationship and the electrical isolation. Alternatively a non-conductive adhesive can be used between the edges of hemispheres 701 and 702. Then vinyl skins 601 and 602 with the geographical information are mounted over the two hemispheres as discussed above with respect to FIG. 11.

In this embodiment each hemisphere has three contact points affixed to the inner edge of each, with hemisphere 701 having contact points 710, 711 and 712, and hemisphere 702 having contact points 740, 741 and 742. Here, each hemisphere is shown with a small hole through the polar cap to permit three insulated conductor cables 730 and 750, respectively, to pass through and have one end of each insulated conductor connect to the three points on the inner edge of the corresponding hemisphere. The other end of each of cables 730 and 750 in-turn are connected to a separate pair of switches in signal generator 722. The upper hemisphere 701 has cable 730 connected to switches 770 and 771, while the lower hemisphere 702 has cable 750 connected to switches 772 and 773.

By comparing FIG. 12 with FIG. 4 it can be seen that while the embodiment of FIG. 4 is for a single surface and FIG. 12 is for a pair of surfaces, the only wiring change between the signal generator of each embodiment is the addition of a second pair of switches for the second surface for the embodiment of FIG. 12. The remainder of the signal generator in each instance is the same with amplifier 134 connected to both pair of switches 770 and 771, and 772 and 773. This is possible since there is only one stylus 116 and only one point on the globe can be selected at one time (i.e., the selected point can only be on one hemisphere at a time). Thus, each hemisphere is treated as an independent location detection surface.

To make a determination as to which of hemispheres 701 and 702 the user has pointed stylus 116, microprocessor 142 is programmed to make a series of measurements. First, as in many of the embodiments discussed above, with stylus 116 pointing at the selected point on one of the hemispheres, $Signal_{FULL}$ and $Signal_{OFFSET}$ are measured for each hemisphere independently, and then the difference between those measured values for each hemisphere (i.e., $Signal_{FULL\text{-}701}-Signal_{OFFSET\text{-}701}$, and $Signal_{FULL\text{-}702}-Signal_{OFFSET\text{-}702}$) is determined and stored in RAM 144. In short, $Signal_{FULL}$ is measured by applying the 60 KHz AC signal to all of the contact points on the surface, and $Signal_{OFFSET}$ is measured will all of the corresponding switch contacts in signal generator 722 for that surface open. Once those difference values are determined, each of those difference values is compared to a pre-selected threshold value. The threshold value is determined empirically and typically are the value measured when the stylus tip is within 0.10 inches from the surface. It is then noted which, if any, of those difference values exceeds the threshold and does so with the greatest margin with the corresponding hemisphere being identified as the one to which stylus 116 is being pointed.

Once the hemisphere of interest has been determined, microprocessor 142 then calculates the position selected by the sequence of calculations outlined above with respect to FIG. 4. Thus, four measurements, $Signal_{FULL}$, $signal_{OFFSET}$, $Signal_{RAW\text{-}AB}$ and $Signal_{RAW\text{-}AC}$ are made on the identified hemisphere and the values of $Signal_{NORM\text{-}AB}$ and $Signal_{NORM\text{-}AC}$ are calculated as in equation 4 with those values defining a unique location on that hemisphere.

The unique location provided by the values of $Signal_{NORM\text{-}AB}$ and $Signal_{NORM\text{-}AC}$, together with the results of the threshold test to determine which hemisphere is of interest to the user, may then be mapped into a location on the globe by means of a look-up table for the selected hemisphere, if necessary, to obtain the longitude and latitude of the point selected, in a standard globe coordinate system. Then, as discussed with respect to FIG. 11, microprocessor 142 can present the user with information relative to the selected point from memory via audio video card 150 and speaker 154, or by any other desired media (e.g., printer, monitor, etc.) or combinations of media.

In addition to the user acting as an antenna and picking up atmospheric noise and signals as described in the Background of the Invention above, there is another secondary effect that can potentially occur if the user is not grounded with respect to the system of the present invention. Since in the present invention the surface to which the user points the probe, in the AC mode, is radiating a different signal at different surface coordinates, a portion of the user's hand, perhaps a finger or thumb, while holding the probe at the desired location may pick-up a different signal from another location spaced away from the location of interest. In such a situation the antenna of the probe can potentially be influenced by that secondary signal capacitively coupled from the surface to the user and then coupled to the antenna of the probe. That secondary signal could result in a modified signal being received by the signal measurement stage 120. That modified signal from the surface might then be processed to identify a location other than the actual location to which the user has pointed the probe tip.

For example, assume that the user has pointed the probe tip of Chicago on the surface of a globe of the present invention. In holding the probe tip at that location the user's thumb might extend east and be close to Detroit while several of the user's fingers extend west of Chicago toward Quincy, Ill. on the Mississippi River. What indeed might happen is that a mix of signals from the location to which the probe is pointed, together with a signal from each finger and the thumb of the user could be received by the signal measurement stage 120 as an averaged signal resulting in the identification of the selected point as a location between Detroit and Quincy, or even somewhere else on the surface that is not even close to the location selected by the user, perhaps Tokyo. Even worse, the signal received by the antenna of the probe may be so complex as a result of all of the various signals coupled to it that the signal measurement stage is unable to identify any location that corresponds to the combined signal. By inclusion of the mechanism to ground the user with respect to the system, as discussed below, this potential problem, as well as any influence created by atmospheric noise as discussed in the Background of the Invention will be resolved by virtually eliminating the other signals coupled to the antenna of the probe from the user.

In each of the embodiments wherein a radiated AC signal is detected by stylus 116 acting as an antenna (see FIGS. 4, 5, 6, 7, 11 and 12), stylus 116 is coupled to demodulator 144 with a shielded cable 118. Shielded cable 118 has been included in an effort to prevent the length of cable 118 from acting as an antenna, in addition to stylus 116, and picking-up signals some distance from and not emanating from the corresponding surface of interest (i.e., 100, 400, 603, 701 or 702).

Figure 13:
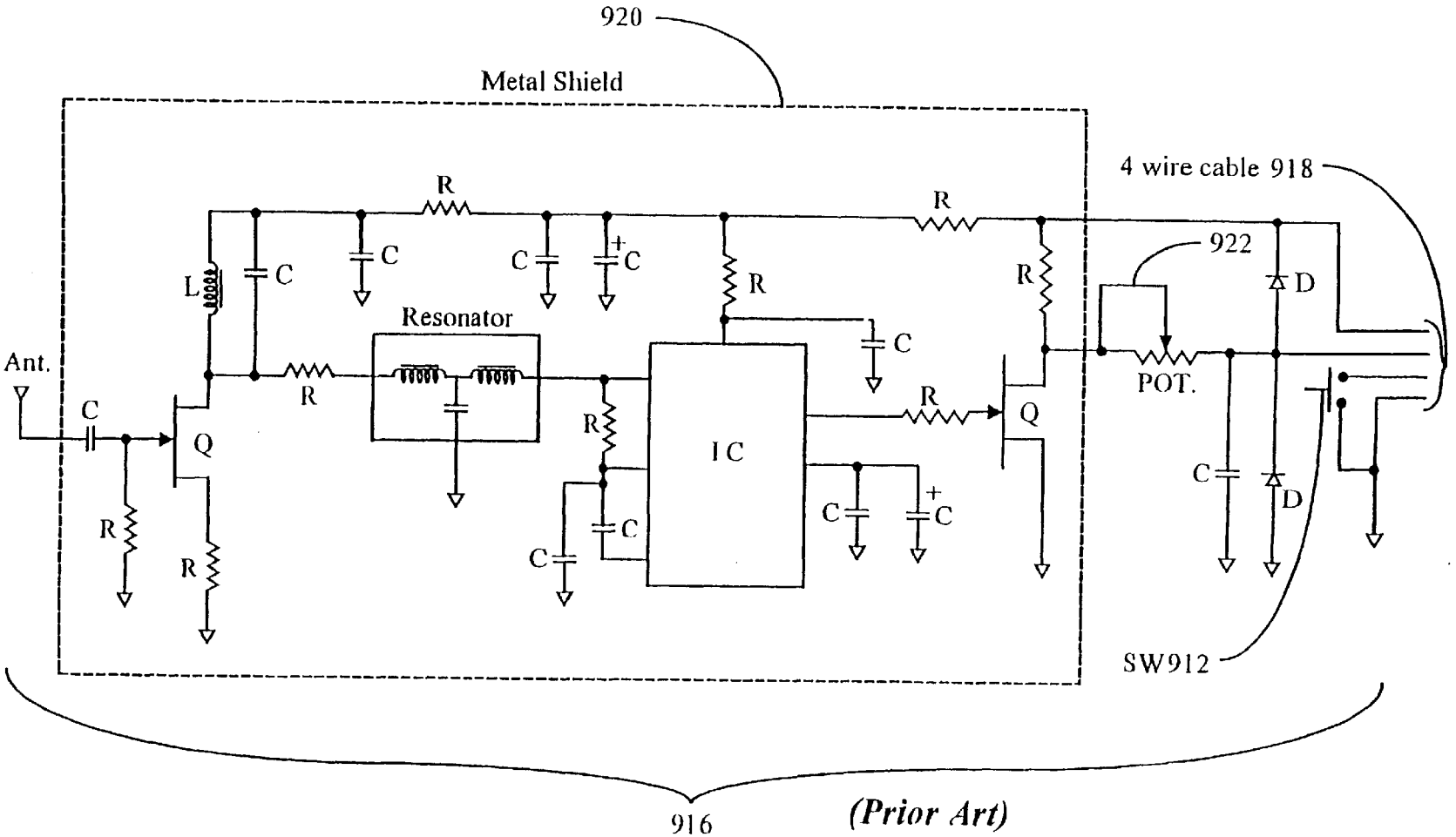
(Prior Art) Fig. 13
FIG. 13 is a prior art embodiment of how a potential interfering signal, from the user holding the antenna stylus is suppressed.

In prior art situations that require an antenna at the distal end of a cable to use as a pointer in a system for locating the point to which the stylus is pointed, the internal circuit configuration of that stylus is very complex. FIG. 13 is a schematic representation of such a stylus 916 used with the SEGA PICO interactive story book toy. Note that even in an industry, the toy industry in this example, where it is imperative to keep costs low to not price a product out of an intended marketplace, a relatively complex circuit has been used. The only saving grace, expense wise, is that the product was probably assembled by low paid workings in a third world country.

There are several differences that can be seen between this design of stylus 916 and stylus 116 of the present invention. First, and foremost is the active circuit design of the prior art that includes two transistors, and specialty design IC, numerous capacitors, inductors and resistors, a power switch and a potentiometer requiring extensive assembly, as opposed to the passive circuit design of the present invention. In addition to the active circuit design there is the necessity of a formed metal shield 920 at the antenna end of stylus 916 to exclude spurious responses from interfering with the signal received from the antenna. There is also a labor-intensive step of calibrating stylus 916 to the system with which it is to be used by means of potentiometer 922. Another added cost item is the use of a four wire cable 918 that is necessary to perform several functions: a shield; a line to carry the received signal back to the main chassis of the product; and two wires to carry power to stylus 920. Finally there is the power switch 912 that needs to be depressed during use to power stylus 916 which can present a problem if the intended user is a child, as is the case with the SEGA product.

Figure 14A:
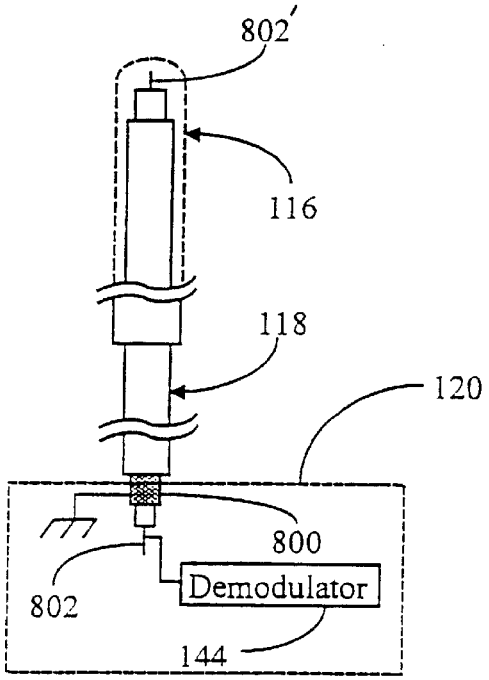
FIG. 14a is a simplified diagram of the stylus and shielded cable of the present invention.

FIG. 14a illustrates one embodiment of the combination of stylus 11 and shielded cable 118. In this view the distal end of stylus 116 is shown in dotted outline to illustrate the end of cable 118 in the interior of the distal end of stylus 116. In this embodiment shielded cable 118 continues to near the extreme distal end of stylus 116 with the shield intact and then a selected length of center conductor 802' is exposed to act as the antenna. At the proximate end of shielded cable 118, shield 800 is grounded in signal measurement stage 120 and center conductor 802 is connected to demodulator 144 to provide the input signal thereto. Thus, in this embodiment an signal that impinges along the length of shielded cable 118 will not contribute to the signal detected by the antenna length of center conductor 802'. However, if the person holding stylus 116 is inadvertently also acting as antenna and radiates some of the received signal to center conductor 802', that signal adds to the desired signal from the surface of interest (e.g., surface 100). Then, depending on many factors including the ability of demodulator 144 to reject unwanted signal frequencies and noise, the position of stylus 116 that is ultimately determined by the position location system of the present invention may not be as accurate as desired.

Figure 14B:
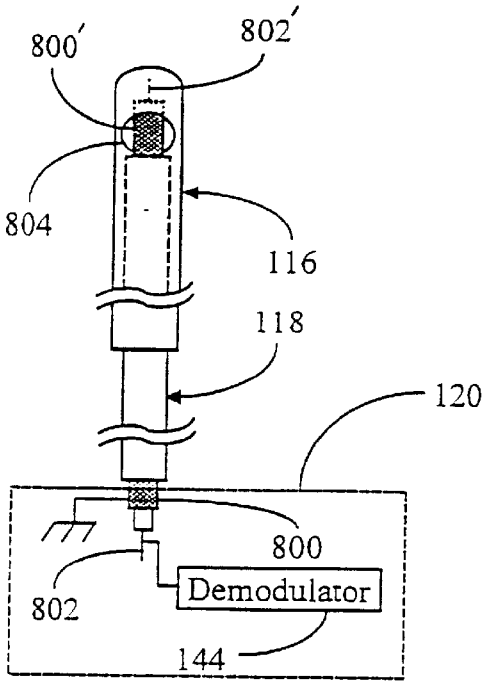
FIG. 14b is another embodiment of the stylus and shielded cable of the present invention that grounds the user to the system of the present invention.

A first embodiment of this aspect of the present invention is illustrated in FIG. 14b. In this view the connections at the proximate end of shielded cable 118 are the same as in FIG. 14a. At the distal end of stylus 116 there are some changes that have been made to effect the grounding of the user when holding stylus 116 to eliminate the parallel antenna effect inadvertently created by the user holding stylus 116 near center conductor/antenna 802'. Here it can be seen that the distal end of shielded cable 118, in addition to having center conductor 802' exposed, has a portion of shield 800' exposed. In addition, stylus 116 defines a hole 804 therethrough so that when a user holds stylus 116 a portion of one of the user's fingers must extend through hole 804 and make contact with shield 800', thus grounding the user.

Figure 14C:
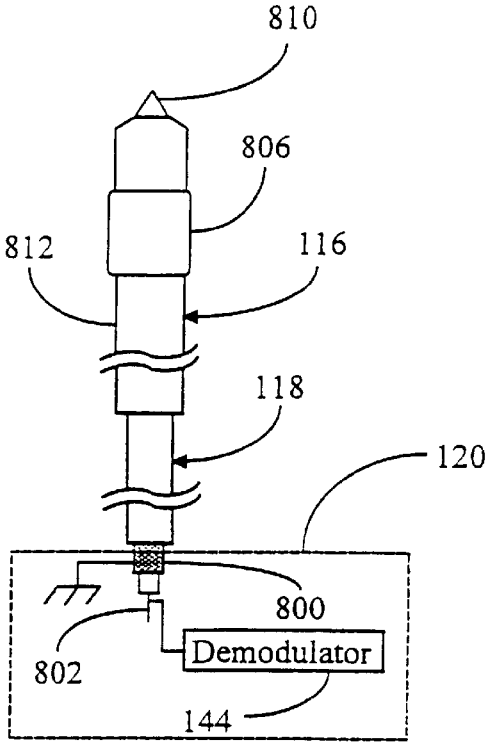
FIG. 14c is still another of the stylus and shielded cable of the present invention that grounds the user to the system of the present invention.
Figure 14D:
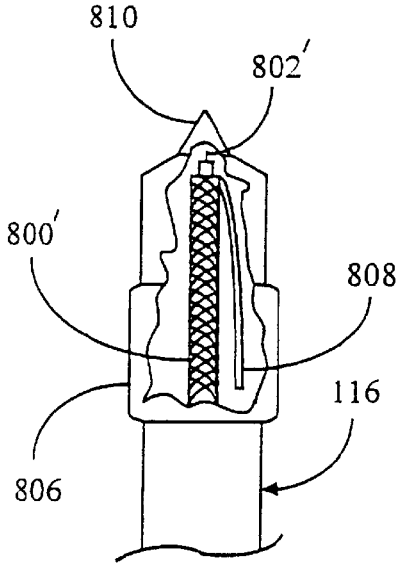
FIG. 14d is a partial cut-away view of the stylus design of FIG. 14c to illustrate the internal positioning of the cable shield and the conductive grip of the stylus.

A second embodiment of this aspect of the present invention is illustrated in FIGS. 14c and 14d with FIG. 14d showing a cut-away view of the distal end of stylus 116 to illustrate the internal configuration of this embodiment. In these views the connections at the proximate end of shielded cable 118 are the same as in FIGS. 14a and 14b. In FIG. 14c stylus 116 includes three portions: tip 810; main body 812; and conductive grip 806 that extends around stylus 116 at the point of the user's grasp. In FIG. 14d a portion of tip 810 and conductive grip 806 have been cutaway to illustrate the internal structure of the distal end of stylus 116. The internal arrangement is similar to that of FIG. 14b with the exception of the length of shield 800' that has been exposed and dressing of a pig-tail 808 of shield 800' back beneath conductive grip 806. Thus, when the user grasps stylus 116 with conductive grip 806 the user is grounded by the electrical interaction of conductive grip 806 and shield 800' and pig-tail 808. Various structures and materials could be used to conductive grip 806 varying from spring loaded metal rings to conductive polymers. One such conductive polymer might be a carbon impregnated Kraton D-2104 polymer (e.g., RTP 2799X66439).

Additionally, it is well known by those skilled in the art how one would store data relative to points on any surface that might be employed with the present invention, as would be look-up tables to convert one coordinate system for a surface to another coordinate system.

While the discussions of the various embodiments of the present invention presented above address a variety of shapes and applications for the present invention, the shapes and applications addressed are clearly not an exhaustive list. One could easily extend such lists to many other shapes and applications and the techniques discussed above could easily be extended to each of them. Thus, the present invention is not limited solely to the scope of what has been discussed above, but rather is only limited by the scope of the claims appended hereto.

What is claimed is:

1. An electrographic sensor unit for use in determining the position of a selected point, which comprises:

a layer of a conductive material having an electrical resistivity and a surface;

K spaced apart contact points electrically interconnected with said layer of conductive material;

a processor connected to said K spaced apart contacts and disposed to selectively apply a signal to N of said K contact points relative to a signal neutral point, and where N has an integer value of 3 to K; and a probe assembly including:

a cable having a first conductor and a second conductor with the proximate end of said one conductor coupled to said processor and the proximate end of said second conductor connected to said signal neutral point; and a stylus coupled to said cable and incorporating therein distal ends of said first and second conductors with the distal end of said first conductor disposed to receive signals from said layer when said contact points have signals selectively applied thereto and said user positions said stylus in vicinity of a user selected point on said surface, and with the distal end of said second conductor disposed to be contacted by said user when holding said stylus to connect said user to said signal neutral point;

wherein said position of said stylus relative to said surface of said layer is determinable by said processor from signals received from said first conductor of said stylus each in relation to a similar excitation of J different pairs of said K contact points under control of said processor, where J is an integer between 2 and (N−1).

2. An electrographic sensor unit as in claim 1 wherein:

said processor selectively applies AC signals to selected ones of said K spaced apart contact points;

said distal end of said first conductor detects signals radiated from said layer of conductive material as an antenna without making physical contact with said layer; and said distal end of said second conductor when contacted by said user connects said user to said signal neutral point to minimize any noise radiated by said user from being received by said distal end of said first conductor and being delivered to said processor.

3. An electrographic sensor unit as in claim 1 wherein said stylus further includes an electrically conductive contact making electrical contact to said distal end of said second conductor, and located externally and positioned to be contacted by the user during use of said stylus.

4. An electrographic sensor unit as in claim 3 wherein said electrically conductive contact is a flexible conductive polymer that encircles said stylus at a position to maximize the user's comfort when holding said stylus.

5. An electrographic sensor unit for use in determining the position of a selected point, which comprises:

a layer of a conductive material having an electrical resistivity and a surface;

three spaced apart contact points electrically interconnected with said layer of conductive material;

a processor connected to said three spaced apart contacts and disposed to selectively apply a signal to each of said three contact points relative to a signal neutral point; and a probe assembly including:

a cable having a first conductor and a second conductor with the proximate end of said one conductor coupled to said processor and the proximate end of said second conductor connected to said signal neutral point; and a stylus coupled to said cable and incorporating therein distal ends of said first and second conductors with the distal end of said first conductor disposed to receive signals from said layer when said contact points have signals selectively applied thereto and said user positions said stylus in vicinity of a user selected point on said surface, and with the distal end of said second conductor disposed to be contacted by said user when holding said stylus to connect said user to said signal neutral point;

wherein said position of said stylus relative to said surface of said layer is determinable by said processor from signals received from said first conductor of said stylus each in relation to a similar excitation of two different pairs of said three contact points under control of said processor.

6. An electrographic sensor unit as in claim 5 wherein:

said processor selectively applies AC signals to selected ones of said three spaced apart contact points;

said distal end of said first conductor detects signals radiated from said layer of conductive material as an antenna without making physical contact with said layer; and said distal end of said second conductor when contacted by said user connects said user to said signal neutral point to minimize any noise radiated by said user from being received by said distal end of said first conductor and being delivered to said processor.

7. An electrographic sensor unit as in claim 5 wherein said stylus further includes an electrically conductive contact making electrical contact to said distal end of said second conductor, and located externally and positioned to be contacted by the user during use of said stylus.

8. An electrographic sensor unit as in claim 7 wherein said electrically conductive contact is a flexible conductive polymer that encircles said stylus at a position to maximize the user's comfort when holding said stylus.

9. An electrographic sensor unit in the form of a globe for use in determining the position of a user selected point on the surface thereof, which comprises:

a sphere formed of a layer of a conductive material having a substantially uniform electrical resistivity and an outer surface;

a set of four spaced apart contact points electrically interconnected with said layer of conductive material of said sphere;

a processor connected to said set of four spaced apart contacts and disposed to selectively apply a signal to each of said four contact points relative to a signal neutral point; and a probe assembly including:

a cable having a first conductor and a second conductor with the proximate end of said one conductor coupled to said processor and the proximate end of said second conductor connected to said signal neutral point; and a stylus coupled to said cable and incorporating therein distal ends of said first and second conductors with the distal end of said first conductor disposed to receive signals from said layer when said contact points have signals selectively applied thereto and said user positions said stylus in vicinity of a user selected point on said sphere, and with the distal end of said second conductor disposed to be contacted by said user when holding said stylus to connect said user to said signal neutral point;

wherein said position of said stylus relative to said surface of said sphere is determinable from three signals received from said stylus by said processor each in relation to a similar excitation of three different pairs of said four contacts on said sphere by said processor.

10. An electrographic sensor unit as in claim 9 wherein:

said processor selectively applies AC signals to selected ones of said four spaced apart contact points;

said distal end of said first conductor detects signals radiated from said layer of conductive material as an antenna without making physical contact with said layer of said sphere; and said distal end of said second conductor when contacted by said user connects said user to said signal neutral point to minimize any noise radiated by said user from being received by said distal end of said first conductor and being delivered to said processor.

11. An electrographic sensor unit as in claim 9 wherein said stylus further includes an electrically conductive contact making electrical contact to said distal end of said second conductor, and located externally and positioned to be contacted by the user during use of said stylus.

12. An electrographic sensor unit as in claim 11 wherein said electrically conductive contact is a flexible conductive polymer that encircles said stylus at a position to maximize the user's comfort when holding said stylus.

13. An electrographic sensor unit for use in determining the position of a selected point, which comprises:

a first layer of a conductive material having an electrical resistivity and a first surface;

a first set of three spaced apart contact points electrically interconnected with said first layer of conductive material;

a second layer of a conductive material having an electrical resistivity and a second surface;

a second set of three spaced apart contact points electrically interconnected with said second layer of conductive material;

a processor connected to each of said first and second sets of three spaced apart contacts and disposed to selectively apply a signal to each of said three contact points in each of said first and second sets thereof; and a probe assembly including:

a cable having a first conductor and a second conductor with the proximate end of said one conductor coupled to said processor and the proximate end of said second conductor connected to said signal neutral point; and a stylus coupled to said cable and incorporating therein distal ends of said first and second conductors with the distal end of said first conductor disposed to receive signals from said layer with said usser selected point when said corresponding set of contact points have signals selectively applied thereto and said user positions said stylus in vicinity of a user selected point on one of said first and second surfaces, and with the distal end of said second conductor disposed to be contacted by said user when holding said stylus to connect said user to said signal neutral point;

wherein identification of which of said first and second surfaces said stylus is adjacent to is accomplished by said processor by independently measuring two signals from each of said first and second layers received by said stylus, combining said signals from the same layer independent of the signals received from the other layer to form a first and a second comparative value with each said comparative value associated with a different one of said first and second layers, and independently comparing each of said first and second comparative values to a preselected threshold value with the layer associated with the one of said first and second comparison value that is greatest and is greater than said threshold being the layer said stylus is closest to and therefore an identified layer of said first and second layers; and wherein said position of said stylus relative to said identified one of said first or second layers is determinable by said processor from signals received from said stylus each in relation to a similar excitation of all of said three contact points on the identified one of said first and second layers and two different pairs of said three contact points on the identified one of said first and second layers under control of said processor.

14. An electrographic sensor unit as in claim 13 wherein:

said processor selectively applies AC signals to selected ones of said four spaced apart contact points;

said distal end of said first conductor detects signals radiated from said layer of conductive material as an antenna without making physical contact with said layer of said sphere; and said distal end of said second conductor when contacted by said user connects said user to said signal neutral point to minimize any noise radiated by said user from being received by said distal end of said first conductor and being delivered to said processor.

15. An electrographic sensor unit as in claim 13 wherein said stylus further includes an electrically conductive contact making electrical contact to said distal end of said second conductor, and located externally and positioned to be contacted by the user during use of said stylus.

16. An electrographic sensor unit as in claim 15 wherein said electrically conductive contact is a flexible conductive polymer that encircles said stylus at a position to maximize the user's comfort when holding said stylus.

*17. An electrographic sensor unit comprising:*

*a) a surface;*

*b) a processor;*

*c) a speaker operatively coupled to the processor;*

*d) a signal neutral point; and*

*e) a probe assembly including*

*(i) a cable including a first conductor with a proximate end and a distal end, the first conductor coupled to the processor, and a second conductor with a proximate end and a distal end, the second conductor coupled to the signal neutral point; and*

*(ii) a stylus having an electrically conductive contact at an exterior of the stylus, wherein the stylus incorporates the distal ends of the first and second conductors, and wherein the second conductor is electrically coupled to the conductive contact.*

*18. The electrographic sensor unit of claim 17 wherein the signal neutral point is ground.*

*19. The electrographic sensor unit of claim 17 further comprising a random access memory in communication with the processor.*

*20. The electrographic sensor unit of claim 17 further comprising a memory operatively coupled to the processor, the memory including a database comprising information relative to positions on the surface, wherein the information is capable of being presented via the speaker.*

*21. The electrographic sensor unit of claim 17 wherein the distal end of the first conductor is capacitively coupled to the surface.*

*22. The electrographic sensor unit of claim 17 wherein the distal end of the first conductor is an antenna.*

*23. The electrographic sensor unit of claim 17 wherein the electrically conductive contact is positioned to be contacted by a user when the user uses the stylus.*

*24. The electrographic sensor unit of claim 17 wherein the electrically conductive contact comprises a flexible conductive polymer that encircles the stylus.*

*25. The electrographic sensor unit of claim 17 wherein the electrically conductive contact comprises a conductive polymer.*

*26. The electrographic sensor unit of claim 17 wherein the stylus further includes a tip, wherein the distal end of the first conductor is closer to the tip than the distal end of the second conductor.*

*27. The electrographic sensor unit of claim 17 wherein the surface is two-dimensional.*

*28. The electrographic sensor unit of claim 17 wherein the surface is three-dimensional.*

*29. An electrographic sensor unit for use in determining the position of a selected point, the electrographic sensor unit comprising:*

*a) a surface;*

*b) a processor;*

*c) a speaker operatively coupled to the processor;*

*d) a signal neutral point;*

*e) a cable; and*

*f) a stylus coupled to the cable, the stylus comprising (i) a main body, (ii) a first conductor coupled to the processor, (iii) a second conductor coupled to the signal neutral point, and (iv) a conductive grip on the main body, wherein the conductive grip is coupled to the second conductor,*

*wherein the position of the stylus relative to the surface is determinable by the processor.*

*30. The electrographic sensor unit of claim 29 wherein the signal neutral point is ground.*

*31. The electrographic sensor unit of claim 29 wherein the first conductor comprises a distal end comprising an antenna, wherein the antenna receives signals from the surface.*

*32. The electrographic sensor unit of claim 29 wherein a distal end of the first conductor is an antenna.*

*33. The electrographic sensor unit of claim 29 wherein the conductive grip comprises a conductive polymer.*

*34. The electrographic sensor unit of claim 29 wherein the conductive grip comprises a conductive polymer comprising carbon.*

*35. The electrographic sensor unit of claim 29 wherein the second conductor is in the form of a shield that shields the first conductor.*

*36. The electrographic sensor unit of claim 29 wherein the conductive grip encircles the main body.*

*37. The electrographic sensor unit of claim 29 wherein a user is grounded when the user is in contact with the conductive grip.*

*38. The electrographic sensor unit of claim 29 further comprising a tip, and wherein the first conductor comprises a distal end and the second conductor comprises a distal end, the distal end of the first conductor being closer to the tip than the distal end of the second conductor.*

*39. The electrographic sensor unit of claim 29 further comprising a memory operatively coupled to the processor, the memory including a database comprising information relative to positions on the surface, wherein the information is capable of being presented via the speaker.*

*40. The electrographic sensor unit of claim 29 further comprising a random access memory.*

*41. The electrographic sensor unit of claim 29 wherein the surface is two-dimensional.*

*42. The electrographic sensor unit of claim 29 wherein the surface is three-dimensional.*

* * * * *

UNITED STATES PATENT AND TRADEMARK OFFICE

CERTIFICATE OF CORRECTION

PATENT NO. : RE 38,286 E
DATED : October 28, 2003
INVENTOR(S) : Mark Flowers

It is certified that error appears in the above-identified patent and that said Letters Patent is hereby corrected as shown below:

The present reissue patent issued from an application that is one of a family of reissue applications resulting from Patent No. 5,877,458. The present reissue patent has issued without the cross reference to the other reissue applications of the family, which is required pursuant to 37 CFR 1.177(a). Accordingly, please insert in the first sentence of the specification as follows:

-- NOTICE: More than one reissue application has been filed for the reissue of Patent No. 5,877,458. The reissue applications are application number 09/796,685 (the present application), and application number 10/667,242, which is a continuation reissue of Patent No. 5,877,458. --

Signed and Sealed this

Twenty-seventh Day of January, 2004

JON W. DUDAS
*Acting Director of the United States Patent and Trademark Office*